US011948517B2

(12) United States Patent
Woo

(10) Patent No.: US 11,948,517 B2
(45) Date of Patent: Apr. 2, 2024

(54) DISPLAY DEVICE

(71) Applicant: Samsung Display Co., LTD., Yongin-si (KR)

(72) Inventor: Deokhwa Woo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/142,807

(22) Filed: May 3, 2023

(65) Prior Publication Data

US 2023/0410754 A1 Dec. 21, 2023

(30) Foreign Application Priority Data

Jun. 20, 2022 (KR) ........................ 10-2022-0075085

(51) Int. Cl.
*G09G 3/3275* (2016.01)

(52) U.S. Cl.
CPC ... *G09G 3/3275* (2013.01); *G09G 2300/0842* (2013.01); *G09G 2320/0276* (2013.01)

(58) Field of Classification Search
CPC ......... G09G 3/3275; G09G 2300/0842; G09G 2320/0276
See application file for complete search history.

(56) References Cited

U.S. PATENT DOCUMENTS 6,542,161 B1 4/2003 Koyama et al.
8,283,219 B2 10/2012 Kim et al.
9,520,075 B2 12/2016 Cho et al.
10,074,300 B2 9/2018 Yeon et al.
11,657,755 B1 * 5/2023 Pai .......................... G09G 3/32 345/694
2012/0032998 A1 * 2/2012 An ...................... G09G 3/3696 345/213
2014/0184654 A1 * 7/2014 Lee ..................... G09G 3/3233 345/84
2021/0264833 A1 * 8/2021 Heo ........................ G09G 3/20
2022/0157258 A1 5/2022 Woo et al.

FOREIGN PATENT DOCUMENTS

| | | | |
|---|---|---|---|
| KR | 100324879 | B1 | 2/2002 |
| KR | 1020050036627 | B1 | 4/2005 |
| KR | 1020170013469 | A | 2/2017 |
| KR | 101766248 | B1 | 8/2017 |
| KR | 101992310 | B1 | 9/2019 |
| KR | 1020220069200 | A | 5/2022 |

* cited by examiner

*Primary Examiner* — Abhishek Sarma
(74) *Attorney, Agent, or Firm* — CANTOR COLBURN LLP

(57) ABSTRACT

A display device includes a display panel and a drive controller. The drive controller classifies an input image signal into a first image signal and a second image signal. The drive controller generates a data histogram by classifying the second image signal based on a plurality of gray levels and selects a first algorithm or a second algorithm based on a number of second image signals included in a part of the plurality of gray levels of the data histogram. The second algorithm calculates a second result value based on a first result value obtained based on the second image signal and a preset kernel matrix, and the drive controller outputs a first data signal corresponding to the second pixel unit in the second display region based on the second result value when the second algorithm is selected.

20 Claims, 20 Drawing Sheets

DISPLAY DEVICE

This application claims priority to Korean Patent Application No. 10-2022-0075085, filed on Jun. 20, 2022, and all the benefits accruing therefrom under 35 U.S.C. § 119, the content of which in its entirety is herein incorporated by reference.

BACKGROUND

1. Field

Embodiments of the disclosure described herein relate to a display device having improved display quality.

2. Description of the Related Art

Various types of display device are used to provide image information. A display device may include an electronic module that receives an external signal or provides an output signal to the outside. For example, the electronic module may include an infrared sensor, a proximity sensor, a camera module, or the like, and demands for a display device capable of obtaining a high-quality photographed image are increasing.

In a display device, an electronic module, such as a camera module, may be disposed under a region in which an image is displayed on a display device to increase the region in which an image is displayed. In a display panel, the number of pixels disposed in a region that overlaps the electronic module may be decreased to prevent deterioration in the performance of the electronic module.

SUMMARY

Embodiments of the disclosure provide a display device having improved display quality.

According to an embodiment, a display device includes a display panel in which a first display region having a first light transmittance and a second display region having a second light transmittance higher than the first light transmittance are defined and a drive controller which receives an input image signal and outputs a data signal to be provided to the display panel. In such an embodiment, the drive controller classifies the input image signal into a first image signal corresponding to a first pixel unit in the first display region of the display panel and a second image signal corresponding to a second pixel unit and a non-pixel unit adjacent to the second pixel unit in the second display region of the display panel. In such an embodiment, the drive controller generates a data histogram by classifying the second image signal based on a plurality of gray levels and selects a first algorithm or a second algorithm different from the first algorithm based on the number of second image signals included in a part of the plurality of gray levels of the data histogram. In such an embodiment, the second algorithm calculates a second result value less than a first result value, based on the first result value obtained based on the second image signal and a preset kernel matrix. In such an embodiment, the drive controller outputs a first data signal corresponding to the second pixel unit in the second display region based on the second result value when the second algorithm is selected.

In an embodiment, the first algorithm may compute an operation on the second image signal and the preset kernel matrix, and the drive controller may output a second data signal corresponding to the second pixel unit in the second display region when the first algorithm is selected.

In an embodiment, the second algorithm may calculate the second result value by multiplying the first result value by 0.

In an embodiment, the second algorithm may calculate the second result value by multiplying the first result value by a weighting value greater than 0 and less than 1.

In an embodiment, the second algorithm may calculate the second result value by substituting the first result value into a function.

In an embodiment, the function may include a cubic function.

In an embodiment, the display device may further include an electronic module disposed to overlap the second display region.

In an embodiment, the number of second pixel units per unit area in the second display region may be smaller than the number of first pixel units per unit area in the first display region.

In an embodiment, the drive controller may select the second algorithm when the number of second image signals included in two lowest gray levels among the plurality of gray levels of the data histogram is in a range of 80% to 90% of the total number of the second image signals.

In an embodiment, the display panel may include a first portion including a first side, a second side parallel to the first side, a third side extending in a direction crossing the first side, and a fourth side parallel to the second side, a second portion extending from the first side and that is at least partially bent, and a third portion extending from the second side and that is at least partially bent.

In an embodiment, the first display region may be defined in the first portion, and the second display region may be defined in the second portion and the third portion.

In an embodiment, the display panel may further include a fourth portion extending from the third side and at least partially bent and a fifth portion extending from the fourth side and at least partially bent, and the second display region may be defined in the fourth portion and the fifth portion In an embodiment, the drive controller may include a gamma conversion unit which converts the input image signal into a gamma image signal, a memory which stores the gamma image signal and outputs the first image signal corresponding to the first pixel unit in the first display region and the second image signal corresponding to the second pixel unit and the non-pixel unit in the second display region, a compensation unit which computes the second image signal and the kernel matrix and outputs a compensated signal, a mapping unit which maps the compensated signal onto the second pixel unit in the second display region, and an inverse gamma conversion unit which converts a signal output from the mapping unit into the data signal.

According to an embodiment, a display device includes a display panel in which a first display region having a first light transmittance and a second display region having a second light transmittance higher than the first light transmittance are defined and a drive controller which receives an input image signal and outputs a data signal to be provided to the display panel. In such an embodiment, the drive controller classifies the input image signal into a first image signal corresponding to a first pixel unit in the first display region of the display panel and a second image signal corresponding to a second pixel unit and a non-pixel unit adjacent to the second pixel unit in the second display region of the display panel. In such an embodiment, the drive controller generates a data histogram by classifying the second image signal based on a plurality of gray levels and selects a first algorithm or a second algorithm different from the first algorithm based on the number of second image signals included in a part of the plurality of gray levels of the data histogram. In such an embodiment, the first algorithm calculates a first result value by computing the second image signal and a preset kernel matrix, and the second algorithm calculates a second result value less than the first result value, based on the first result value. In such an embodiment, the drive controller outputs a first data signal corresponding to the second pixel unit in the second display region when the first algorithm is selected, and the drive controller outputs a second data signal corresponding to the second pixel unit in the second display region based on the second result value when the second algorithm is selected.

In an embodiment, the second algorithm may include a first method, a second method, and a third method. In such an embodiment, the first method may calculate the second result value by multiplying the first result value by 0, the second method may calculate the second result value by multiplying the first result value by a weighting value greater than 0 and less than 1, and the third method may calculate the second result value by substituting the first result value into an n-th order function, where n is an integer greater than 1.

In an embodiment, the drive controller may select the first method when the number of second image signals included in two lowest gray levels among the plurality of gray levels of the data histogram is 90% or more of the total number of second image signals. In such an embodiment, the drive controller may select the second method or the third method when the number of the second image signals included in the two lowest gray levels among the plurality of gray levels of the data histogram is greater than or equal to 80% and less than 90% of the total number of the second image signals. In such an embodiment, the drive controller may select the first algorithm when the number of the second image signals included in the two lowest gray levels among the plurality of gray levels of the data histogram is greater than or equal to 0% and less than 80% of the total number of the second image signals.

In an embodiment, the number of second pixel units per unit area in the second display region may be smaller than the number of first pixel units per unit area in the first display region.

In an embodiment, the display device may further include an electronic module disposed to overlap the second display region, and the electronic module may include a camera.

In an embodiment, the display panel may include a first portion that includes a first side, a second side parallel to the first side, a third side extending in a direction crossing the first side, and a fourth side parallel to the second side, where the first display region is defined in the first portion, a second portion extending from the first side and at least partially bent, where the second display region is defined in the second portion, and a third portion extending from the second side and at least partially bent, where the second display region is defined in the third portion.

In an embodiment, the display panel may further include a fourth portion extending from the third side and at least partially bent and a fifth portion extending from the fourth side and at least partially bent. In such an embodiment, the second display region may be defined in the fourth portion and the fifth portion.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
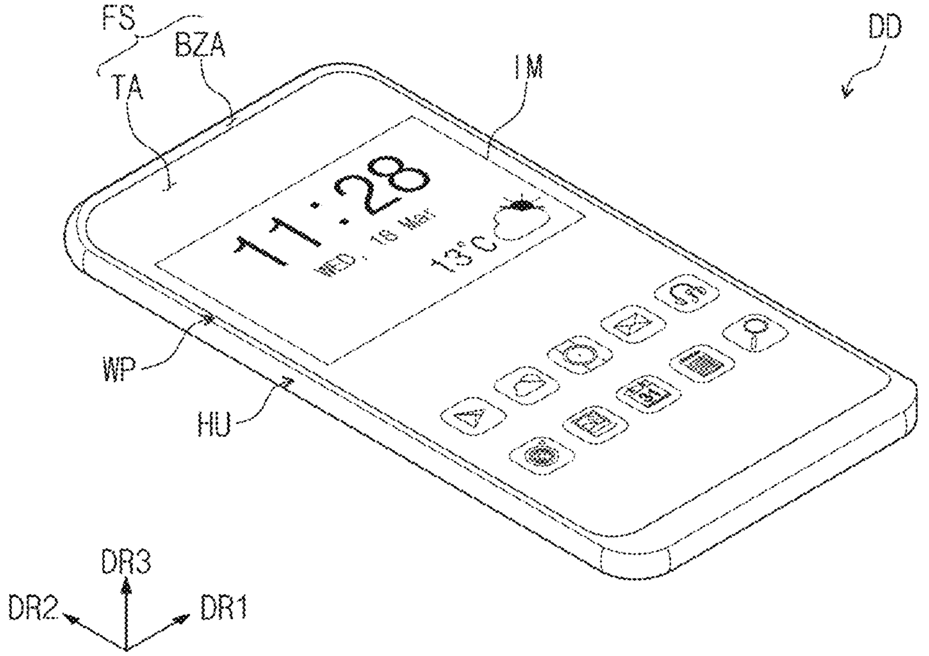
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween. In contrast, when an element is referred to as being "directly on" another element, there are no intervening elements present.

Identical reference numerals refer to identical components. Additionally, in the drawings, the thicknesses, proportions, and dimensions of components are exaggerated for effective description. "Or" means "and/or." As used herein, the term "and/or" includes all of one or more combinations defined by related components.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
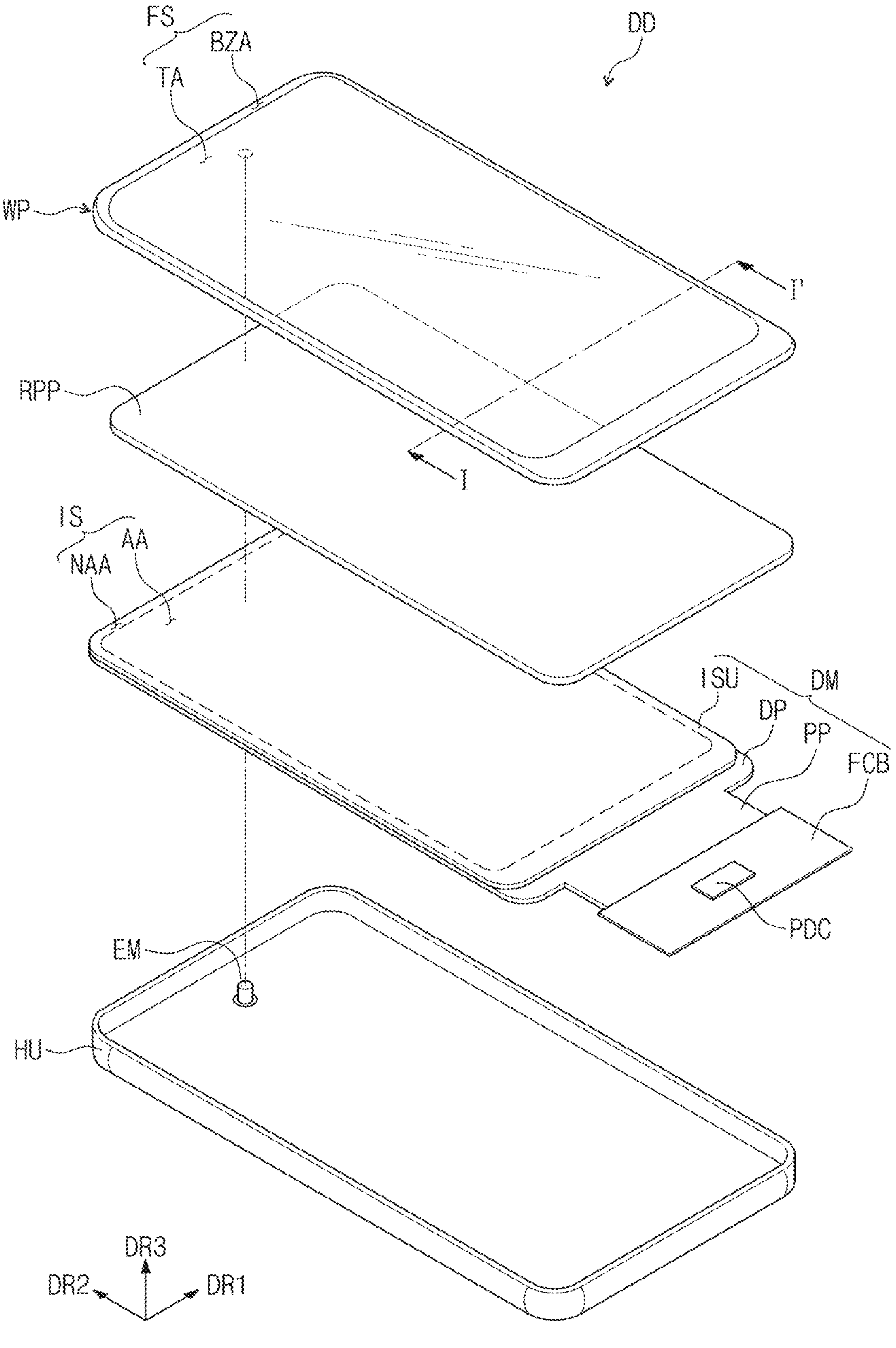
FIG. 2 is an exploded perspective view of the display device according to an embodiment of the disclosure.

FIG. 1 is a perspective view of a display device according to an embodiment of the disclosure, and FIG. 2 is an exploded perspective view of the display device according to an embodiment of the disclosure.

Referring to FIGS. 1 and 2, an embodiment of the display device DD may be a device activated in response to an electrical signal. The display device DD may be used for or included in one of various types of device. In an embodiment, for example, the display device DD may be used not only for large electronic devices, such as a television, a monitor, and outdoor signage, but also for small and medium-sized electronic devices, such as a personal computer, a notebook computer, a personal digital assistant, a car navigation unit, a game machine, a portable electronic device, and a camera. However, these devices are merely illustrative, and the display device DD may be applied to other electronic devices as long as not deviating from the spirit and scope of the disclosure. In an embodiment, the display device DD may be a smart phone as shown in FIG. 1.

The display device DD may display an image IM in a third direction DR3 on a display surface FS parallel to a first direction DR1 and a second direction DR2. The image IM may include a still image as well as a dynamic image. In an embodiment, as shown in FIG. A, the image IM may be a clock and icons. The display surface FS on which the image IM is displayed may correspond to a front surface of the display device DD and may correspond to a front surface of a window panel WP.

In an embodiment, front surfaces (or, upper surfaces) and rear surfaces (or, lower surfaces) of members are defined based on the direction in which the image IM is displayed. The front surfaces and the rear surfaces may face away from other in the third direction DR3, and normal directions of the front surfaces and the rear surfaces may be parallel to the third direction DR3. In the drawings, the directions indicated by the first, second, and third directions DR1, DR2, and DR3 may be relative concepts and may be changed to different directions.

The display device DD according to an embodiment of the disclosure may sense a user's input applied from the outside. The user's input includes various forms of external inputs such as a part of the user's body, light, heat, pressure, and the like. In addition, the display device DD may sense the user's input applied to a side surface or a rear surface of the display device DD depending on a structure of the display device DD and is not limited to any one embodiment.

In an embodiment, as shown in FIG. 2, the display device DD may include the window panel WP, an anti-reflector RPP, a display module DM, an electronic module EM, and a housing HU. In such an embodiment, the window panel WP and the housing HU are coupled to form the exterior of the display device DD.

The window panel WP may include an optically transparent insulating material. In an embodiment, for example, the window panel WP may include glass or plastic. The window panel WP may have a multi-layer structure or a single-layer structure. In an embodiment, for example, the window panel WP may include a plurality of plastic films coupled through an adhesive, or may include a glass substrate and a plastic film coupled through an adhesive.

The display surface FS of the window panel WP defines the front surface of the display device DD as described above. The display surface FS may include a transmissive region TA and a bezel region BZA.

The transmissive region TA may be an optically transparent region. In an embodiment, for example, the transmissive region TA may be a region having a visible light transmittance of about 90% or greater. The bezel region BZA may be a region having a lower light transmittance than the transmissive region TA. The bezel region BZA may have a predetermined color. The bezel region BZA defines the shape of the transmissive region TA. The bezel region BZA may be adjacent to the transmissive region TA and may surround the transmissive region TA. In the window panel WP according to an alternative embodiment of the disclosure, the bezel region BZA may be omitted.

The anti-reflector RPP may be disposed under the window panel WP. The anti-reflector RPP decreases the reflectivity of external light incident from above the window panel WP. In an embodiment of the disclosure, the anti-reflector RPP may be omitted, or may be embedded in the display module DM.

The display module DM may display the image IM and may sense an external input. The display module DM includes a front surface IS including an active region AA and a peripheral region NAA. The active region AA may be a region activated in response to an electrical signal.

In an embodiment, the active region AA may be a region where the image IM is displayed and may be a region where the external input is sensed at the same time. The transmissive region TA overlaps at least the active region AA. In an embodiment, for example, the transmissive region TA overlaps all or at least part of the active region AA. Accordingly, the user may visually recognize the image IM through the transmissive region TA, or may provide the external input through the transmissive region TA. However, this is illustrative. In an alternative embodiment, the region where the image IM is displayed and the region where the external input is sensed may be separated from each other in the active region AA, and the disclosure is not limited to any one embodiment.

The peripheral region NAA may be a region covered by the bezel region BZA. The peripheral region NAA is adjacent to the active region AA. The peripheral region NAA may surround the active region AA. A drive circuit or a drive line for driving the active region AA may be disposed in the peripheral region NAA.

In an embodiment, the display module DM is assembled in a flat state in which the active region AA and the peripheral region NAA face toward the window panel WP. However, this is illustrative, and alternatively, a portion of the peripheral region NAA of the display module DM may be bent when assembled. In such an embodiment, the portion of the peripheral region NAA may face toward the rear surface of the display device DD, and thus the bezel region BZA on the front surface of the display device DD may be decreased. Alternatively, the display module DM may be assembled in a state in which a portion of the active region AA is also bent.

The display module DM may include a display panel DP, an input sensor ISU, and a drive circuit DC.

The display panel DP may be a component that substantially generates the image IM. The image IM generated by the display panel DP may be visible to the user from the outside through the transmissive region TA.

The input sensor ISU senses an external input applied from the outside. In an embodiment, as described above, the input sensor ISU may sense an external input provided to the window panel WP.

The display panel DP may include a pad region PP. A plurality of signal pads may be disposed on the pad region PP of the display panel DP. The display panel DP may be electrically connected with a printed circuit board FCB through the signal pads. In an embodiment, a driver integrated circuit (IC) for generating signals used for operation of the display panel DP may be mounted on the pad region PP.

The printed circuit board FCB may include various drive circuits for driving the display panel DP and the input sensor ISU or a connector for supply of power. In an embodiment, the printed circuit board FCB may include a panel drive circuit PDC for driving the display panel DP. The panel drive circuit PDC may be defined by or formed as an integrated circuit and may be mounted on the printed circuit board FCB.

The electronic module EM may be disposed under the display module DM. In an embodiment, the electronic module EM may be coupled to a rear surface of the display module DM through an adhesive member (not illustrated).

On a plane or when viewed in a plan view, the electronic module EM may be disposed to overlap the active region AA. Accordingly, a space in which the electronic module EM is disposed in the bezel region BZA may be omitted, and an increase in the area of the bezel region BZA may be prevented.

In an embodiment, for example, where the electronic module EM includes a light source element, such as an infrared light emitting diode, an organic light emitting diode, a laser diode, or a phosphor, which outputs light, the electronic module EM may output light to the outside through the transmissive region TA. In an embodiment where the electronic module EM is a light receiving module, such as an infrared light detection sensor, a proximity sensor, a charge-coupled device (CCD), a light detection sensor, a photo-transistor, or a photo-diode, the electronic module EM may receive external light delivered through the transmissive region TA. In an embodiment, the electronic module EM may be a camera. The electronic module EM may not be constituted or defined by a single element and may be configured in an array form in which a plurality of elements is collectively provided.

The housing HU is coupled with the window panel WP. The housing HU may be coupled with the window panel WP to provide a space in which the anti-reflector RPP, the display module DM, and the electronic module EM are accommodated.

The housing HU may include a material having a relatively high stiffness. In an embodiment, for example, the housing HU may include glass, plastic, or metal, or may include a plurality of frames and/or plates formed of a combination of the mentioned materials. The housing HU may stably protect the components of the display device DD accommodated in the inner space from an external impact.

Figure 3:
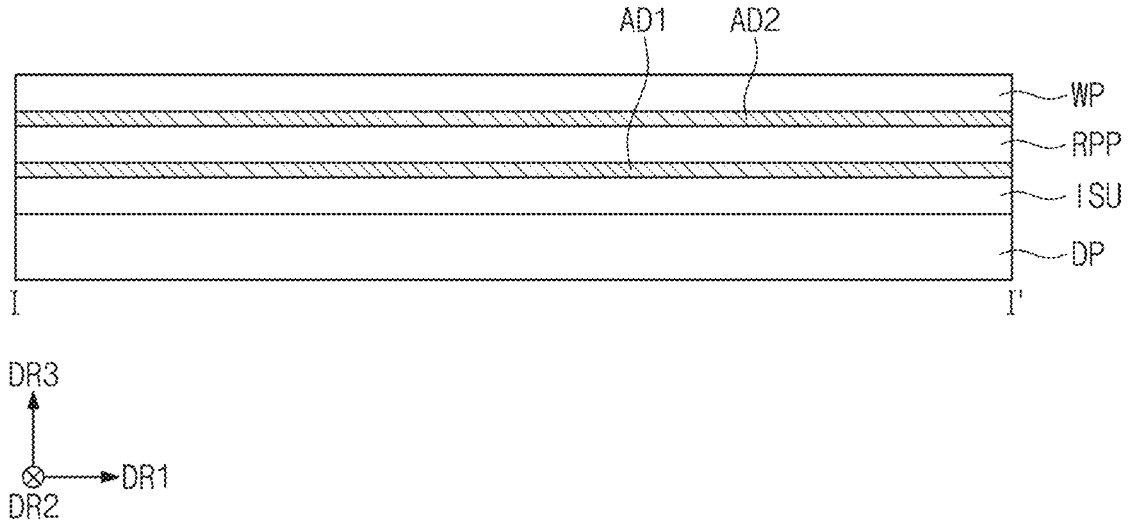
FIG. 3 is a cross-sectional view taken along line I-I' of FIG. 2 according to an embodiment of the disclosure.

FIG. 3 is a cross-sectional view taken along line I-I' of FIG. 2 according to an embodiment of the disclosure.

FIG. 3 illustrates a section of the display device DD defined by the first direction DR1 and the third direction DR3. In FIG. 3, for convenience of illustration and description, components of the display device DD are schematically illustrated to show a stacked relationship thereof.

The display device DD according to an embodiment of the disclosure may include the display panel DP, the input sensor ISU, the anti-reflector RPP, and the window panel WP. At two selected from the display panel DP, the input sensor ISU, the anti-reflector RPP, and the window panel WP may be formed by a continuous process, or may be coupled together through an adhesive member. In an embodiment, for example, the input sensor ISU and the anti-reflector RPP may be coupled by an adhesive member AD1. The anti-reflector RPP and the window panel WP may be coupled by an adhesive member AD2.

The adhesive members AD1 and AD2 may be transparent adhesive members such as a pressure sensitive adhesive (PSA) film, an optically clear adhesive (OCA) film, or an optically clear resin (OCR). Adhesive members to be described below may include a conventional adhesive or sticky substance. In an alternative embodiment of the disclosure, the anti-reflector RPP and the window panel WP may be replaced with other components, or may be omitted.

In an embodiment, among the input sensor ISU, the anti-reflector RPP, and the window panel WP shown in FIG. 3, the input sensor ISU formed with the display panel DP through a continuous process may be directly disposed on the display panel DP. The expression "a component B is directly disposed on a component A" used herein means that a separate adhesive layer/adhesive member is not disposed between the component A and the component B. The component B is formed, through a continuous process, on a base surface provided by the component A after the component A is formed.

In an embodiment, the anti-reflector RPP and the window panel WP are of a "panel" type, and the input sensor ISU is of a "layer" type. The "panel" type may include a base layer (e.g., a synthetic resin film, a composite film, a glass substrate, or the like) that provides a base surface, whereas the "layer" type may not include the base layer. In other words, components of a "layer" type are disposed on base surfaces provided by other components. In an embodiment of the disclosure, the anti-reflector RPP and the window panel WP may be of a "layer" type.

The display panel DP generates an image, and the input sensor ISU obtains coordinate information of an external input (e.g., a touch event). Although not separately illustrated, the display device DD according to an embodiment of the disclosure may further include a protective member disposed on a lower surface (or, a rear surface) of the display panel DP. The protective member and the display panel DP may be coupled through an adhesive member.

The display panel DP according to an embodiment of the disclosure may be an emissive display panel, but is not particularly limited. In an embodiment, for example, the display panel DP may be an organic light emitting display panel, a quantum-dot light emitting display panel, a micro light emitting diode (micro LED) display panel, or a nano light emitting diode (nano LED) display panel. The panels are distinguished from one another depending on constituent materials of light emitting elements. An emissive layer of the organic light emitting display panel may include an organic light emitting material. An emissive layer of the quantum-dot light emitting display panel may include quantum dots and/or quantum rods. An emissive layer of the micro LED display panel may include micro LEDs. An emissive layer of the nano LED display panel may include nano LEDs.

The anti-reflector RPP decreases the reflectivity of external light incident from above the window panel WP. The anti-reflector RPP according to an embodiment of the disclosure may include a phase retarder and a polarizer. The phase retarder may be of a film type or a liquid-crystal coating type. The polarizer may also be of a film type or a liquid-crystal coating type. The film type may include a stretchable synthetic resin film, and the liquid-crystal coating type may include liquid crystals arranged in a predetermined arrangement. The phase retarder and the polarizer may further include a protective film. The phase retarder and the polarizer themselves or the protective film may be defined as a base layer of the anti-reflector RPP.

The anti-reflector RPP according to an embodiment of the disclosure may include color filters. The color filters have a predetermined arrangement. The arrangement of the color filters may be determined in consideration of light emission colors of pixels included in the display panel DP. The anti-reflector RPP may further include a black matrix adjacent to the color filters.

The anti-reflector RPP according to an embodiment of the disclosure may include a destructive interference structure. In an embodiment, for example, the destructive interference structure may include a first reflective layer and a second reflective layer that are disposed on different layers. First reflected light and second reflected light reflected by the first reflective layer and the second reflective layer, respectively, may destructively interfere with each other, and thus the reflectivity of external light may be decreased.

The window panel WP according to an embodiment of the disclosure may include a glass substrate and/or a synthetic resin film. In an embodiment, the window panel WP may be defined by a single layer. In an alternative embodiment, the window panel WP may include two or more films coupled through an adhesive member. Although not separately illustrated, the window panel WP may further include a functional coating layer. The functional coating layer may include an anti-fingerprint layer, an anti-reflection layer, and a hard coating layer.

Figure 4:
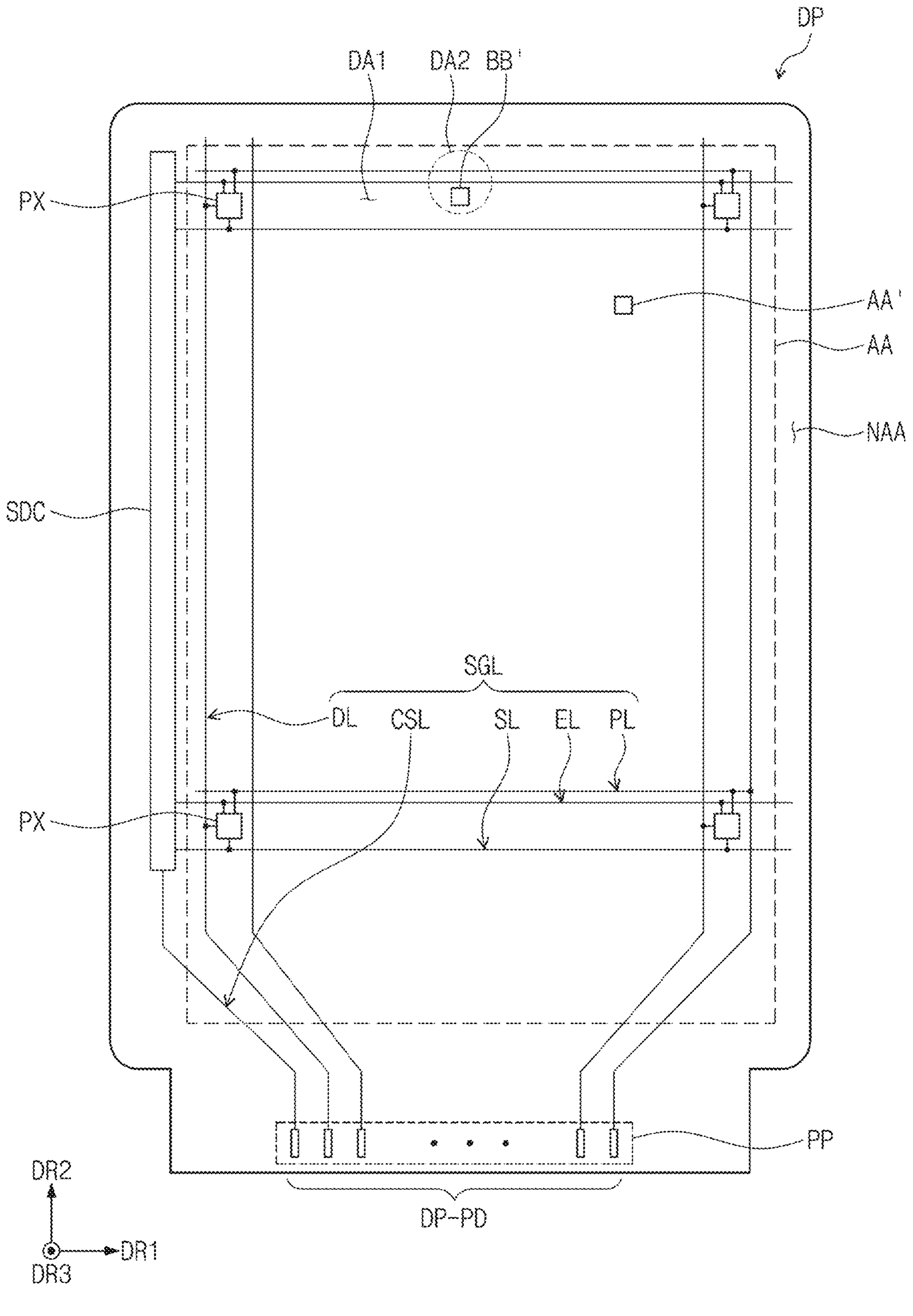
FIG. 4 is a plan view of a display panel according to an embodiment of the disclosure.

FIG. 4 is a plan view of the display panel according to an embodiment of the disclosure.

Referring to FIG. 4, an embodiment of the display panel DP may include a scan drive circuit SDC, a plurality of signal lines SGL (hereinafter, referred to as the signal lines), a plurality of signal pads DP-PD, and a plurality of pixels PX (hereinafter, referred to as the pixels).

The scan drive circuit SDC generates a plurality of scan signals (hereinafter, referred to as the scan signals) and sequentially outputs the scan signals to a plurality of scan lines SL (hereinafter, referred to as the scan lines) to be described below. The scan drive circuit SDC may output other control signals as well as the scan signals to the pixels PX.

The scan drive circuit SDC may include a plurality of transistors formed through the same process as transistors in the pixels PX.

The signal lines SGL include the scan lines SL, data lines DL, a power line PL, light emission control lines EL, and a control signal line CSL. Each of the scan lines SL, the data lines DL, and the light emission control lines EL is connected to a corresponding one of the pixels PX. The power line PL is commonly connected to the pixels PX. The control signal line CSL may provide control signals to the scan drive circuit SDC. The power line PL may provide a voltage used for operation of the pixels PX. The power line PL may include a plurality of lines that provide different voltages from each other.

In an embodiment, the signal lines SGL may further include auxiliary lines SSL. The auxiliary lines SSL are signal lines connected to the input sensor ISU (refer to FIG. 2). In an alternative embodiment of the disclosure, the auxiliary lines SSL may be omitted. The auxiliary lines SSL may be connected to contact holes CNT, respectively. The auxiliary lines SSL may be electrically connected with signal lines of the input sensor ISU (refer to FIG. 6), which will be described below, through the contact holes CNT.

The signal pads DP-PD may be electrically connected to the data lines DL, the power line PL, and the control signal line CSL. The signal pads DP-PD are disposed adjacent to each other in the pad region PP defined in a partial region of the peripheral region NAA.

The active region AA may be defined as a region in which the pixels PX are disposed. A plurality of electronic elements is disposed in the active region AA. In an embodiment, the electronic elements include organic light emitting diodes included in the respective pixels PX and pixel drive circuits connected to the organic light emitting diodes. The scan drive circuit SDC, the signal lines SGL, the signal pads DP-PD, and the pixel drive circuits may be included in a circuit element layer DP-CL illustrated in FIG. 3.

Although not illustrated in the drawing, each of the pixels PX may include a plurality of transistors, a capacitor, and an organic light emitting diode. The pixels PX emit light in response to signals received through the scan lines SL, the data lines DL, the light emission control lines EL, and the power line PL.

The signal pads DP-PD of the display panel DP may be electrically connected with the printed circuit board FCB illustrated in FIG. 2.

A portion of the display panel DP illustrated in FIG. 4 may be bent. A portion of the peripheral region NAA of the display panel DP may be bent with respect to a bending axis parallel to the first direction DR1. The bending axis may be defined to overlap some of the data lines DL.

A first display region DA1 and a second display region DA2 may be defined in the display panel DP. The first display region DA1 and the second display region DA2 may constitute the active region AA of the display panel DP. The resolution of the first display region DA1 may differ from the resolution of the second display region DA2. In an embodiment, for example, the resolution of the second display region DA2 may be lower than the resolution of the first display region DA1.

In an embodiment of the disclosure, the first display region DA1 may surround the second display region DA2. The second display region DA2 may be a region that overlaps the electronic module EM (refer to FIG. 2) on a plane and is adjacent to the first display region DA1. The transmittance of the second display region DA2 may be higher than the transmittance of the first display region DA1. Accordingly, an optical signal may be effectively transmitted to or received from the electronic module EM disposed under the second display region DA2 through the second display region DA2.

Figure 5:
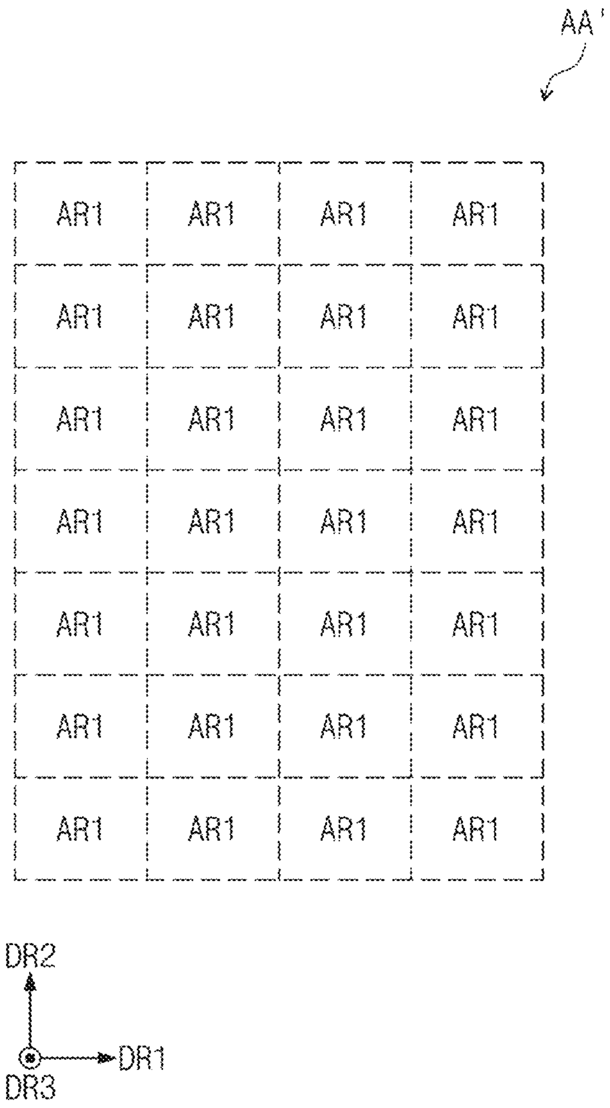
FIG. 5 is an enlarged plan view illustrating region AA' of FIG. 4 according to an embodiment of the disclosure.
Figure 6:
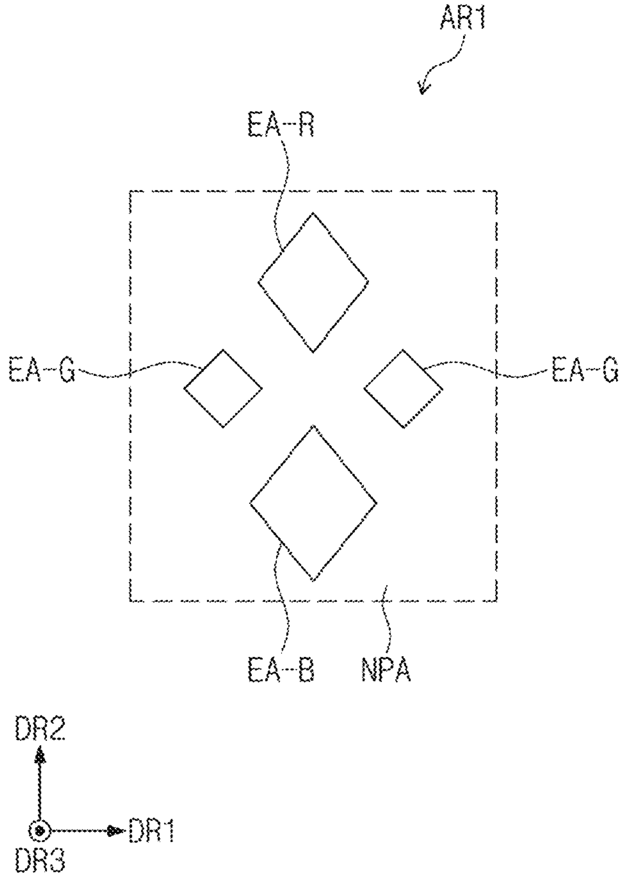
FIG. 6 is a plan view illustrating a configuration of emissive regions included in one pixel unit illustrated in FIG. 5 according to an embodiment of the disclosure.

FIG. 5 is an enlarged plan view illustrating region AA' of FIG. 4 according to an embodiment of the disclosure, and FIG. 6 is a plan view illustrating a configuration of emissive regions included in one pixel unit illustrated in FIG. 5 according to an embodiment of the disclosure. FIG. 5 illustrates a schematic view of pixel units disposed in region AA' of FIG. 4.

Referring to FIGS. 4 to 6, the first display region DA1 may include or be divided into first pixel units AR1. At least one pixel may be disposed in each of the first pixel units AR1. The first pixel unit AR1 may be a region that provides an image. The first pixel units AR1 may be arranged in the first direction DR1 and the second direction DR2. The pixels disposed in the first pixel units AR1 may provide light.

Referring to FIG. 6, emissive regions EA-B, EA-G, and EA-R may be defined in each of the first pixel units AR1 disposed in the first display region DA1. The first emissive region EA-B is an emissive region of a first color pixel, the second emissive region EA-G is an emissive region of a second color pixel, and the third emissive region EA-R is an emissive region of a third color pixel. Each of the emissive regions EA-B, EA-G, and EA-R may correspond to a pixel PX.

Each of the first pixel units AR1 may include the first emissive region EA-B, the second emissive region EA-G, and the third emissive region EA-R. In an embodiment illustrated in FIG. 6, the first pixel unit AR1 includes one first emissive region EA-B, two second emissive regions EA-G, and one third emissive region EA-R. However, embodiments are not limited thereto.

In an embodiment, as shown in FIG. 6, the emissive regions EA-B, EA-G, and EA-R included in the first pixel unit AR1 may have a rhombic shape on a plane, but embodiments are not limited thereto.

In the first pixel unit AR1, the two second emissive regions EA-G may be spaced apart from each other in the first direction DR1, and the first emissive region EA-B and the third emissive region EA-R may be spaced apart from each other with the second emissive regions EA-G therebetween. The emissive regions EA-B, EA-G, and EA-R may be separated from one another by a non-emissive region NPA. The emissive regions EA-B, EA-G, and EA-R may be regions separated from one another by a pixel defining film PDL (refer to FIG. 9), and the non-emissive region NPA may be a region that overlaps the pixel defining film PDL.

In an embodiment, one of the two second emissive regions EA-G included in the first pixel unit AR1 may be defined as a fourth emissive region distinguished from the other one of the two second emissive regions EA-G. In an embodiment, as shown in FIG. 6, the two second emissive regions EA-G may have same shape and area as each other on the plane. However, embodiments are not limited thereto. In an alternative embodiment, the second emissive region EA-G and the fourth emissive region may have different shapes from each other on the plane.

In an embodiment, the configuration of the first pixel units AR1 included in the first display region DA1 is not limited to that illustrated in the drawings, and the number of emissive regions included in one first pixel unit AR1, the ratio of the areas of different emissive regions, an arrangement relationship between the emissive regions, and the shapes of the emissive regions may be diversely changed and combined depending on display quality desired for the display panel DP.

In an embodiment, the one first emissive region EA-B may generate blue light. The two second emissive regions EA-G may generate green light. The one third emissive region EA-R may generate red light. The blue light, the green light, and the red light may be changed to other three primary color lights.

Figure 7:
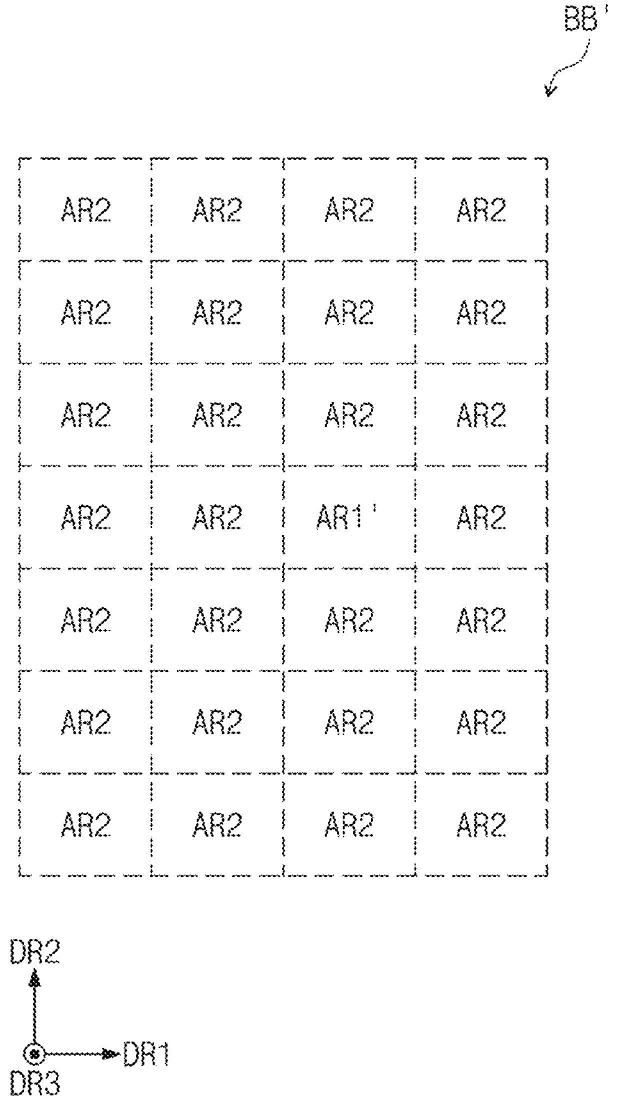
FIG. 7 is an enlarged plan view illustrating region BB' of FIG. 4 according to an embodiment of the disclosure.
Figure 8:
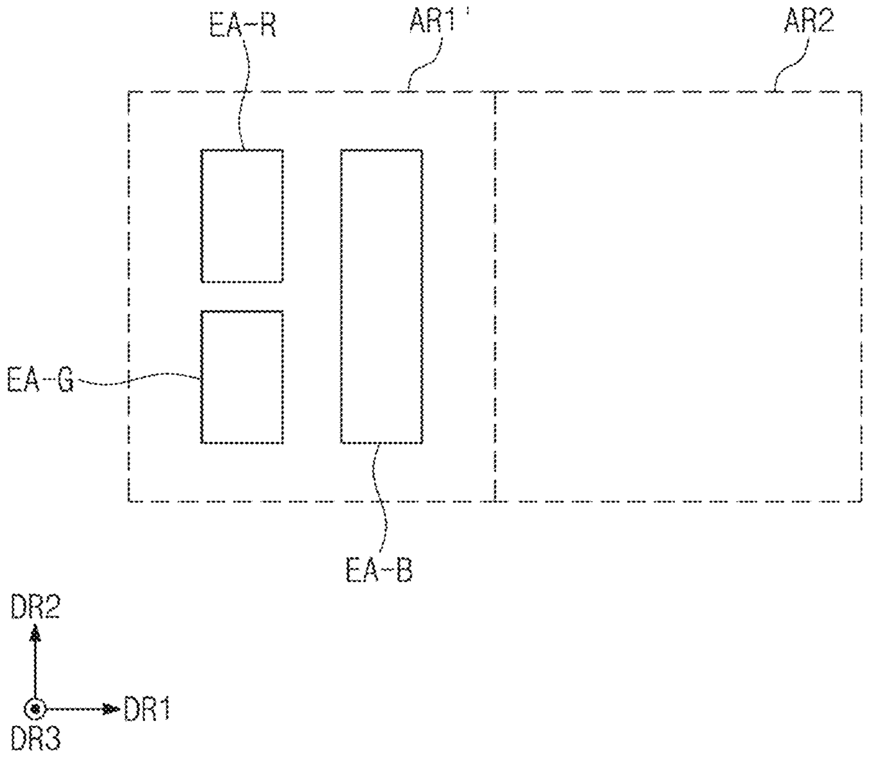
FIG. 8 is a plan view illustrating a portion of region BB' illustrated in FIG. 7 according to an embodiment of the disclosure.

FIG. 7 is an enlarged plan view illustrating region BB' of FIG. 4 according to an embodiment of the disclosure, and FIG. 8 is a plan view illustrating a portion of region BB' illustrated in FIG. 7 according to an embodiment of the disclosure. FIG. 7 illustrates a schematic view of pixel units disposed in region BB' of FIG. 4.

Referring to FIGS. 4 to 8, the second display region DA2 may include a second pixel unit AR1' and a non-pixel unit AR2.

The second pixel unit AR1' may have one pixel disposed therein and may be a region that provides an image. At least one missing pixel (or dummy pixel) may be disposed in the non-pixel unit AR2. The missing pixel may be a pixel in which a part of components constituting the pixel is omitted. The pixel disposed in the second pixel unit AR1' may provide light. The missing pixel disposed in the non-pixel unit AR2 may not provide light. Semiconductor patterns, conductive patterns, metal patterns, or signal lines may not be disposed in the non-pixel unit AR2. A reflective electrode and a non-transmissive electrode may not be disposed in the non-pixel unit AR2. An optical signal may be substantially transmitted or pass through the non-pixel unit AR2. In an embodiment, for example, through the non-pixel unit AR2, a signal provided by the electronic module EM (refer to FIG. 2) may be output to the outside, or a signal input from the outside may be received by the electronic module EM (refer to FIG. 2).

That is, the non-pixel unit AR2 may be a region not including a pixel. The non-pixel unit AR2 may be referred to as a low-reflection region, a transmissive region, a non-display region, a non-emissive region, or a transflective region. Since the second display region DA2 includes the non-pixel unit AR2 that does not provide an image, the second display region DA2 may have a lower resolution than the first display region DA1.

A plurality of second pixel units AR1' and a plurality of non-pixel units AR2 may be provided in the second display region DA2. The second pixel units AR1' and the non-pixel units AR2 may be arranged according to a predetermined rule or arrangement. In an embodiment, for example, as illustrated in FIG. 7, 27 non-pixel units AR2 may be arranged as one unit around one second pixel unit AR1', and accordingly a plurality of units may be disposed in the second display region DA2. FIG. 7 illustrates an arrangement relationship between the second pixel unit AR1' and the non-pixel units AR2 according to an embodiment. However, the disclosure is not limited thereto. In an embodiment where the second display region DA2 has a structure including both the second pixel units AR1' and the non-pixel units AR2, various modifications may be made.

FIG. 8 is a plan view illustrating a configuration of a second pixel unit AR1' and a non-pixel unit AR2 of the second display region DA2.

As illustrated in FIG. 8, the second pixel unit AR1' may include at least three emissive regions EA-B, EA-G, and EA-R. The second pixel unit AR1' may include one first emissive region EA-B, one second emissive region EA-G, and one third emissive region EA-R. However, embodiments are not limited thereto.

In an embodiment, as shown in FIG. 8, the emissive regions EA-B, EA-G, and EA-R included in the second pixel unit AR1' may have a rectangular shape on a plane, but embodiments are not limited thereto.

In the second pixel unit AR1', the second emissive region EA-G and the third emissive region EA-R may be spaced apart from each other in the second direction DR2. The first emissive region EA-B may be spaced apart from the second emissive region EA-G and the third emissive region EA-R in the first direction DR1. The first emissive region EA-B may have an area greater than the sum of the areas of the second emissive region EA-G and the third emissive region EA-R.

In an alternative embodiment, the first pixel unit AR1 and the second pixel unit AR1' may have a same configuration of emissive regions.

In an embodiment, the size of the second pixel unit AR1' may differ from the size of the first pixel unit AR1. In an embodiment, for example, the size of the second pixel unit AR1' may be greater than the size of the first pixel unit AR1. However, embodiments are not limited thereto.

Figure 9:
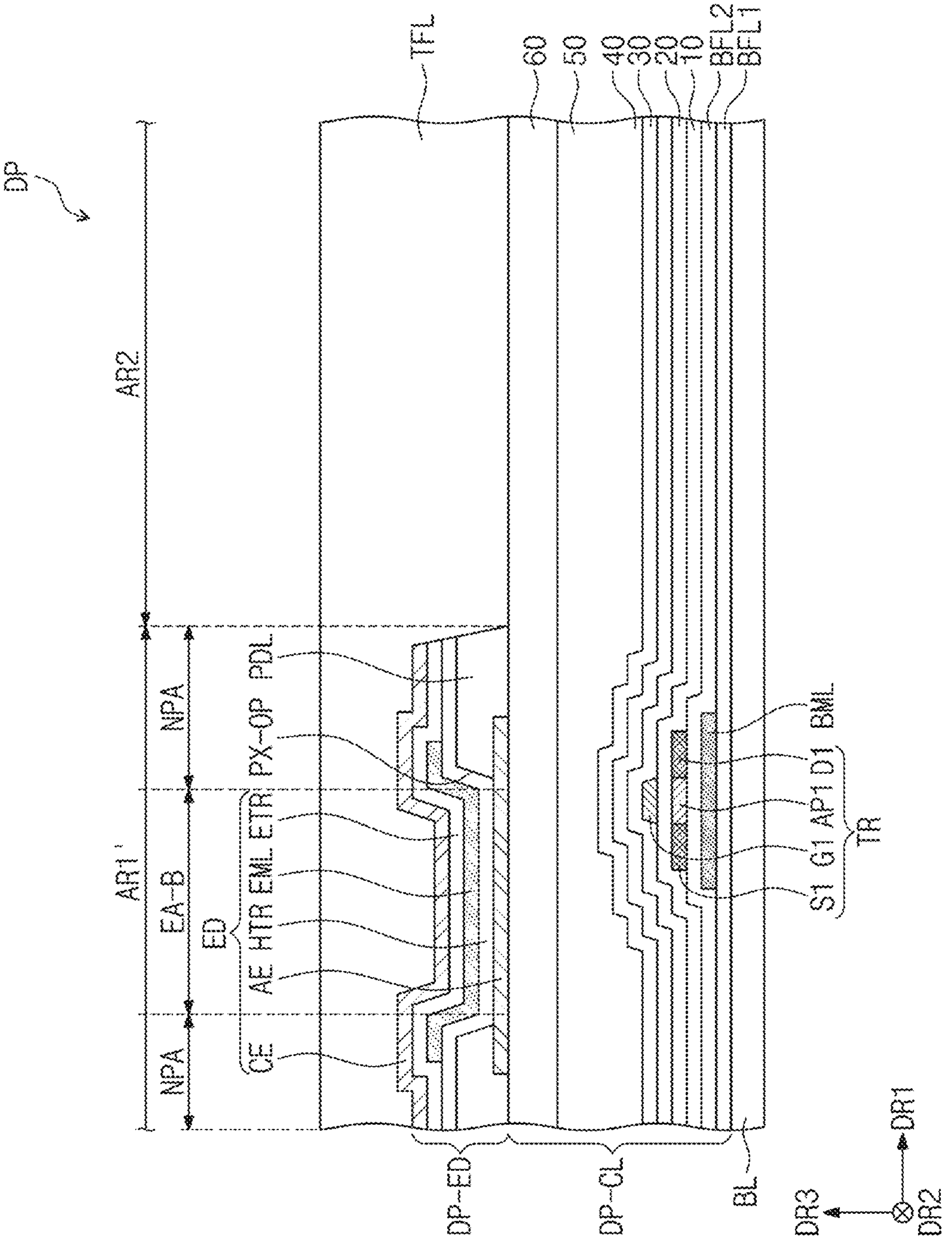
FIG. 9 is a cross-sectional view illustrating a portion of a second display region of the display panel according to an embodiment of the disclosure.

FIG. 9 is a cross-sectional view illustrating a portion of the second display region of the display panel according to an embodiment of the disclosure.

Referring to FIG. 9, an embodiment of the display panel DP may include a plurality of insulating layers, a semiconductor pattern, a conductive pattern, a metal pattern, and a signal line. In an embodiment, an insulating layer, a semiconductor layer, a conductive layer, and a metal layer may be formed by a method such as coating or deposition. Thereafter, the insulating layer, the semiconductor layer, the conductive layer, and the metal layer may be selectively subjected to patterning through photolithography. The semiconductor pattern, the conductive pattern, a shielding pattern, the metal pattern, and the signal line included in a circuit element layer DP-CL and a light emitting element layer DP-ED are formed by the above-described method. Thereafter, an upper insulating layer TFL that covers the light emitting element layer DP-ED may be formed.

A transistor TR and a light emitting element ED may be disposed on a base layer BL. The light emitting element ED may include a first electrode AE, a second electrode CE, and an emissive layer EML disposed between the first electrode AE and the second electrode CE. In addition, the light emitting element ED may include a hole transporting region HTR disposed between the first electrode AE and the emissive layer EML and an electron transporting region ETR disposed between the emissive layer EML and the second electrode CE.

A first buffer layer BFL1 may be disposed on the base layer BL. The first buffer layer BFL1 may improve a coupling force between the base layer BL and a metal pattern such as a shielding pattern BML. The first buffer layer BFL1 may include at least one selected from silicon oxide layers and silicon nitride layers. The silicon oxide layers and the silicon nitride layers may be alternately stacked one on another.

The shielding pattern BML may be disposed on the first buffer layer BFL1. In an alternative embodiment, the first buffer layer BFL1 may be omitted. In such an embodiment, the shielding pattern BML may be provided on the upper surface of the base layer BL.

The shielding pattern BML may overlap the transistor TR. The shielding pattern BML may overlap an active region AP1 and may serve as a protective layer that prevents deterioration in electrical characteristics of the active region AP1. In addition, the shielding pattern BML may protect the transistor TR from light or moisture introduced from below the base layer BL in a process of manufacturing the display device. The shielding pattern BML may include or be formed of a material having a low light transmittance. In an embodiment, for example, the shielding pattern BML may be a metal pattern including molybdenum (Mo).

Light incident on the shielding pattern BML may be reflected by the upper surface or the lower surface of the shielding pattern BML. In an embodiment, a second buffer layer BFL2 may be disposed on the shielding pattern BML.

The second buffer layer BFL2 may cover the entire shielding pattern BML. A semiconductor pattern is disposed on the second buffer layer BFL2. The semiconductor pattern may include a silicon semiconductor. The semiconductor pattern may include poly-silicon or amorphous silicon. Furthermore, the semiconductor pattern may include a metal oxide semiconductor.

The semiconductor pattern has different electrical properties depending on whether the semiconductor pattern is doped or not. The semiconductor pattern may include a doped region and an undoped region depending on the degree of doping. The doped region may be doped with an N-type dopant or a P-type dopant. A P-type transistor includes a doped region doped with a P-type dopant.

The doped region may have a higher doping concentration than the undoped region and may have a higher conductivity than the undoped region. The doped region may substantially serve as an electrode or a signal line. The undoped region may correspond to an active (or, channel) region of the transistor. In such an embodiment, one portion of the semiconductor pattern may be an active (or, channel) region of the transistor, another portion of the semiconductor pattern may be a source (or, an input electrode region) or a drain (or, an output electrode region) of the transistor, and another portion may be a connecting signal line (or, a connecting electrode). However, embodiments are not limited thereto, and the active (or, channel) region of the transistor may also be doped with a dopant.

In an embodiment, as illustrated in FIG. 9, a source S1, the active region AP1, and a drain D1 of the transistor TR are formed from or defined by portions of the semiconductor pattern. A first insulating layer 10 may be disposed on the semiconductor pattern. A gate G1 of the transistor TR may be disposed on the first insulating layer 10. A second insulating layer 20 may be disposed on the gate G1. Third to fifth insulating layers 30, 40, and 50 may be disposed on the second insulating layer 20.

Although not illustrated, the transistor TR and the light emitting element ED may be electrically connected by a connecting electrode (not illustrated). In an embodiment, for example, the connecting electrode (not illustrated) may electrically connect the transistor TR and the light emitting element ED through contact holes defined in the third to fifth insulating layers 30, 40, and 50. A sixth insulating layer 60 may be disposed on the fifth insulating layer 50. In an embodiment, as shown in FIG. 9, the first to sixth insulating layers 10 to 60 may be stacked one on another, but the number of insulating layers may be variously modified, i.e., decreased or increased.

The layers from the first buffer layer BFL1 to the sixth insulating layer 60 may be defined as the circuit element layer DP-CL. The circuit element layer DP-CL may include at least one metal pattern such as the shielding pattern BML, the semiconductor pattern S1, AP1, and D1, the gate G1, or the connecting electrode (not illustrated). The at least one metal pattern may not be included in the non-pixel unit AR2. The non-pixel unit AR2 may not include the shielding pattern BML, the semiconductor pattern S1, AP1, and D1, and the gate G1 and may include the plurality of insulating layers. The non-pixel unit AR2 may correspond to a transmissive region that has a high light transmittance, compared to the second pixel unit AR1'. In the display device DD according to an embodiment, a portion corresponding to the non-pixel unit AR2 may be referred to as a non-pixel region, and a portion corresponding to the second pixel unit AR1' may be referred to as a pixel region.

The first electrode AE may be disposed on the sixth insulating layer 60. The first electrode AE may be an anode electrode. The pixel defining film PDL may be disposed on the first electrode AE and the sixth insulating layer 60. An opening PX-OP for exposing a predetermined portion of the first electrode AE may be defined in the pixel defining film PDL.

The pixel defining film PDL may include or be formed of a polymer resin. In an embodiment, for example, the pixel defining film PDL may include a polyacrylate-based resin or a polyimide-based resin. Furthermore, the pixel defining film PDL may include an inorganic material, in addition to the polymer resin. In an embodiment, the pixel defining film PDL may include a light absorbing material, or may include a black pigment or a black dye. The pixel defining film PDL including the black pigment or the black dye may implement a black pixel defining film. When the pixel defining film PDL is formed, carbon black may be used as the black pigment or the black dye. However, embodiments are not limited thereto.

The hole transporting region HTR may be disposed on the first electrode AE1 and the pixel defining film PDL. The hole transporting region HTR may be commonly disposed in the first emissive region EA-B and the non-emissive region NPA. The hole transporting region HTR may include a hole transporting layer and a hole injection layer.

The emissive layer EML may be disposed on the hole transporting region HTR. The emissive layer EML may be disposed in a region corresponding to the opening PX_OP. The emissive layer EML may include an organic material and/or an inorganic material. In an embodiment, as shown in FIG. 9, the emissive layer EML may be a portion that emits blue light or an emissive layer EML of the first emissive region EA-B. In such an embodiment, the emissive layer EML of the second emissive region EA-G (refer to FIG. 8) may generate green light, and the emissive layer EML of the third emissive region EA-R (refer to FIG. 8) may generate red light. The second emissive region EA-G (refer to FIG. 8) and the third emissive region EA-R (refer to FIG. 8) may also have a stacked structure corresponding to the first emissive region EA-B illustrated in FIG. 9.

The electron transporting region ETR may be disposed on the emissive layer EML and the hole transporting region HTR. The electron transporting region ETR may be commonly disposed in the first emissive region EA-B and the non-emissive region NPA. The electron transporting region ETR may include an electron transporting layer and an electron injection layer.

The second electrode CE may be disposed on the electron transporting region ETR. The second electrode CE may be a cathode electrode. The second electrode CE may be provided as a common layer.

In an embodiment, as shown in FIG. 9, the hole transporting region HTR, the electron transporting region ETR, and the second electrode CE may extend to the non-emissive region NPA. However, embodiments are not limited thereto, and alternatively, the hole transporting region HTR, the electron transporting region ETR, and the second electrode CE may also be subjected to patterning to correspond to the emissive region.

The layer having the light emitting element ED disposed therein may be defined as the light emitting element layer DP-ED. The upper insulating layer TFL may be disposed on the light emitting element ED.

The first electrode AE may not be included in the non-pixel unit AR2. The non-pixel unit AR2 may overlap the upper insulating layer TFL. Although not illustrated in the drawing, in an embodiment where the second electrode CE is a transparent electrode, the non-pixel unit AR2 may include at least a portion of the second electrode CE.

In the portion corresponding to the non-pixel unit AR2, an optical signal provided from outside the display device DD may transmit through the display panel DP and may be provided to the electronic module EM (refer to FIG. 2), or an optical signal emitted from the electronic module EM (refer to FIG. 2) may transmit through the display panel DP and may be provided outside the display device DD. That is, since the metal pattern or the conductive pattern included in the circuit element layer DP-CL of the display panel DP is not disposed in the portion corresponding to the non-pixel unit AR2, an optical signal provided as transmitted light may effectively transmit through the portion corresponding to the non-pixel unit AR2.

Figure 10:
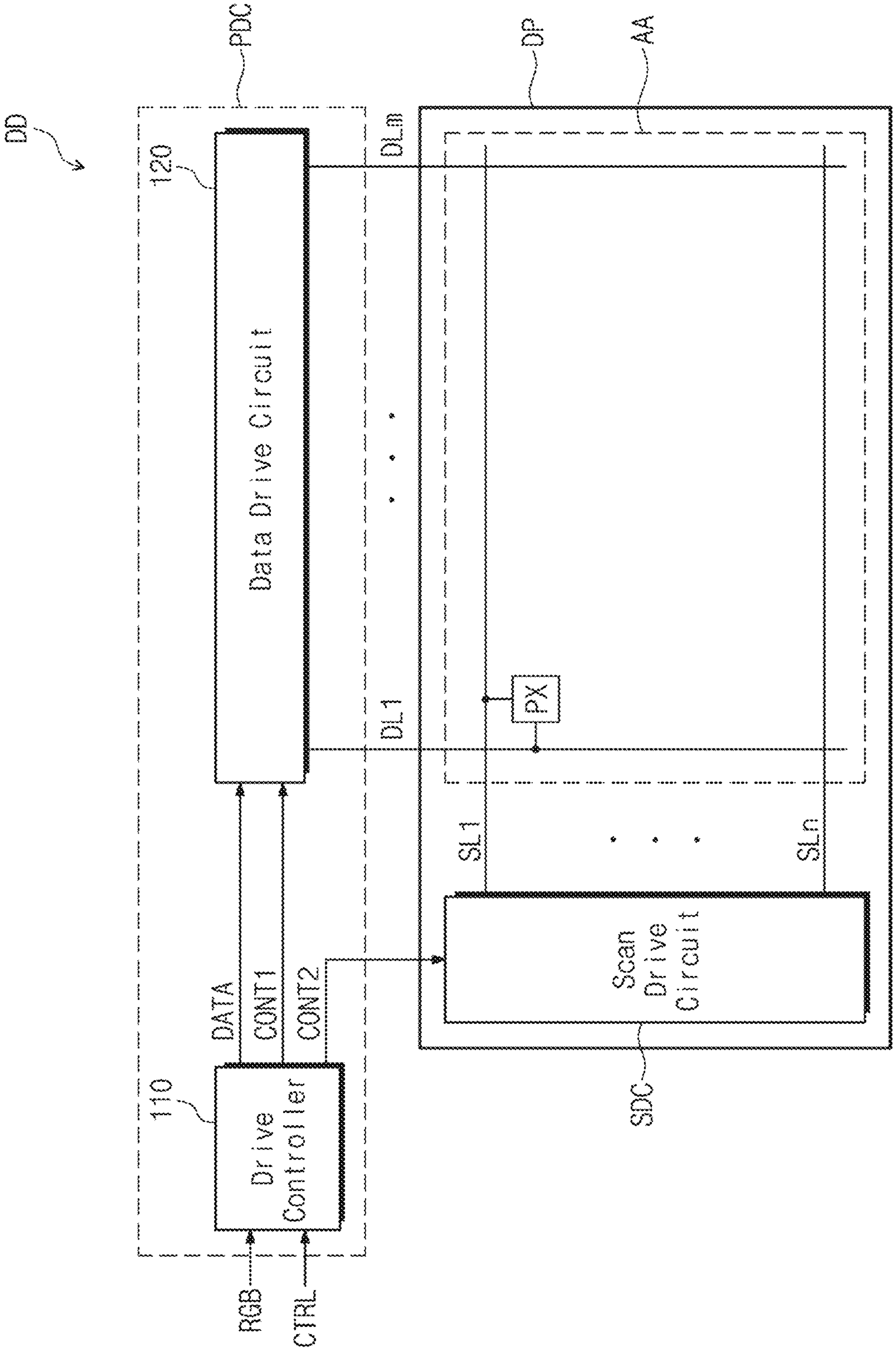
FIG. 10 is a block diagram of the display device according to an embodiment of the disclosure.

FIG. 10 is a block diagram of the display device according to an embodiment of the disclosure.

Referring to FIG. 10, an embodiment of the display device DD may include the display panel DP and the panel drive circuit PDC.

As described above with reference to FIG. 4, the display panel DP may include the scan drive circuit SDC, the scan lines SL1 to SLn, the data lines DL1 to DLm, and the pixels PX.

The panel drive circuit PDC receives an input image signal RGB and controls the pixels PX to display an image by providing data signals corresponding to a data signal DATA to the pixels PX through the data lines DL1 to DLm of the display panel DP.

The panel drive circuit PDC may include a drive controller 110 and a data drive circuit 120.

The drive controller 110 receives the input image signal RGB and control signals CTRL from the outside. The control signals CTRL may include, for example, a vertical synchronization signal, a horizontal synchronization signal, a main clock signal, and a data enable signal. The drive controller 110 provides a first control signal CONT1 and the data signal DATA obtained by processing the input image signal RGB according to an operating condition of the display panel DP based on the control signals CTRL to the data drive circuit 120 and provides a second control signal CONT2 to the scan drive circuit SDC. The first control signal CONT1 may include a horizontal synchronization start signal, a clock signal, and a line latch signal, and the second control signal CONT2 may include a vertical synchronization start signal, an output enable signal, and a gate pulse signal. The drive controller 110 may diversely change and output the data signal DATA depending on the arrangement of the pixels PX of the display panel DP, a display frequency, and the like.

The scan drive circuit SDC drives the scan lines SL1 to SLn in response to the second control signal CONT2 from the drive controller 110. The data drive circuit 120 drives the data lines DL1 to DLm in response to the data signal DATA and the first control signal CONT1 from the drive controller 110.

Figure 11:
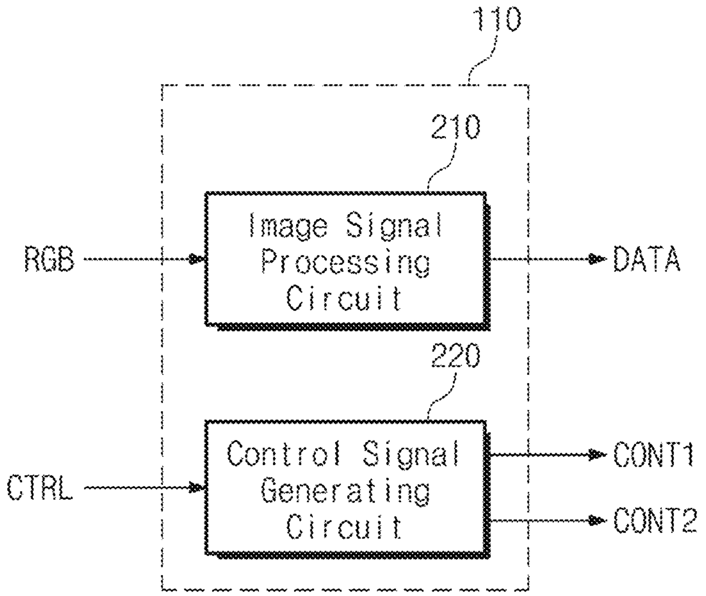
FIG. 11 is a block diagram illustrating a configuration of a drive controller according to an embodiment of the disclosure.

FIG. 11 is a block diagram illustrating a configuration of the drive controller according to an embodiment of the disclosure.

Referring to FIG. 11, an embodiment of the drive controller 110 may include an image signal processing circuit 210 and a control signal generating circuit 220.

The image signal processing circuit 210 receives the input image signal RGB from the outside and outputs the data signal DATA. The control signal generating circuit 220 outputs the first control signal CONT1 and the second control signal CONT2, based on the control signals CTRL received from the outside. The first control signal CONT1 may include a horizontal synchronization start signal, a clock signal, and a line latch signal, and the second control signal CONT2 may include a vertical synchronization start signal, an output enable signal, and a gate pulse signal.

Figure 12:
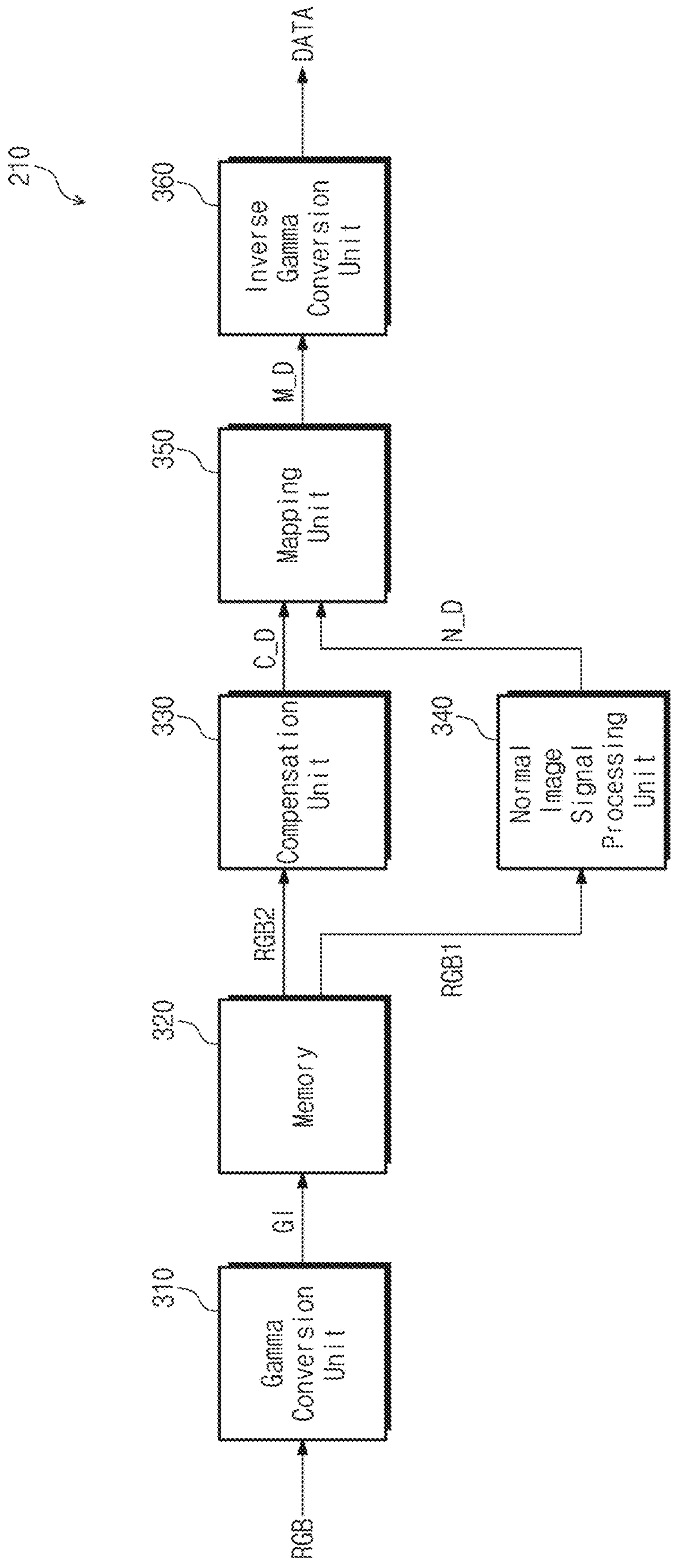
FIG. 12 is a block diagram illustrating a configuration of an image signal processing circuit according to an embodiment of the disclosure.

The input image signal RGB may include a first image signal RGB1 (refer to FIG. 12) and a second image signal RGB2 (refer to FIG. 12).

The first image signal RGB1 (refer to FIG. 12) may correspond to the first pixel unit AR1 (refer to FIG. 5) in the first display region DA1 (refer to FIG. 4).

The second image signal RGB2 (refer to FIG. 12) may include a first signal corresponding to the second pixel unit AR1' (refer to FIG. 7) in the second display region DA2 (refer to FIG. 4) of the display panel DP and a second signal corresponding to the non-pixel unit AR2 (refer to FIG. 7).

The image signal processing circuit 210 in the drive controller 110 may generate a data histogram BH (refer to FIG. 14) by classifying the second image signal RGB2 (refer to FIG. 12) based on a plurality of gray levels. The image signal processing circuit 210 may select a first algorithm or a second algorithm, based on the number of second image signals RGB2 (refer to FIG. 12) included in a part of the plurality of gray levels of the data histogram BH (refer to FIG. 14).

The first algorithm may compute the second image signal RGB2 (refer to FIG. 12) and preset kernel data and may output the data signal DATA corresponding to the second pixel unit AR1'.

The second algorithm may output a second result value less than a first result value, based on the first result value obtained by computing the second image signal RGB2 (refer to FIG. 12) and preset kernel data and may output the data signal DATA corresponding to the second pixel unit AR1', based on the second result value. Operations of the image signal processing circuit 210 will be described later in greater detail.

In such an embodiment, since the image signal processing circuit 210 outputs the data signal DATA corresponding to the second pixel unit AR1' in consideration of not only the first signal of the second image signal RGB2 (refer to FIG. 12) that corresponds to the second pixel unit AR1' but also the second signal of the second image signal RGB2 (refer to FIG. 12) that corresponds to the non-pixel unit AR2, the image signal processing circuit 210 may effectively prevent deterioration in the display quality of the second display region DA2.

FIG. 12 is a block diagram illustrating a configuration of the image signal processing circuit according to an embodiment of the disclosure.

Referring to FIG. 12, an embodiment of the image signal processing circuit 210 includes a gamma conversion unit 310, a memory 320, a compensation unit 330, a normal image signal processing unit 340, a mapping unit 350, and an inverse gamma conversion unit 360.

The input image signal RGB may include a first color signal, a second color signal, and a third color signal. In an embodiment, for example, the first color signal may be a blue signal, the second color signal may be a green signal, and the third color signal may be a red signal. However, this is illustrative, and signals included in the input image signal RGB may be diversely provided without being limited thereto.

The gamma conversion unit 310 linearizes the input image signal RGB having non-linear characteristics and outputs a gamma image signal GI. Specifically, the gamma conversion unit 310 may linearize the input image signal RGB based on a gamma look-up table (not illustrated) and may output the gamma image signal GI. The gamma look-up table may store luminance data depending on or corresponding to a reference gamma value.

The memory 320 stores the gamma image signal GI output from the gamma conversion unit 310. The memory 320 may be a line memory capable of storing the gamma image signal GI corresponding to a predetermined number of lines in an image of one frame. In an embodiment, the memory 320 may store a gamma image signal RGB1 of each of seven lines.

The memory 320 may output the first image signal RGB1 corresponding to the first display region DA1 (refer to FIG. 4) and the second image signal RGB2 corresponding to the second display region DA2 (refer to FIG. 4).

The compensation unit 330 compensates for the second image signal RGB2 corresponding to the second display region DA2 and outputs a compensated image signal C_D. The compensated image signal C_D may include color signals corresponding to the three emissive regions EA-B, EA-G, and EA-R illustrated in FIG. 8.

The normal image signal processing unit 340 converts the first image signal RGB1 corresponding to the first display region DA1 into a normal image signal N_D.

The first image signal RGB1 may include a first color signal, a second color signal, and a third color signal, and the normal image signal N_D may include first to fourth color signals corresponding to the four emissive regions EA-B, EA-G, and EA-R illustrated in FIG. 6.

The mapping unit 350 receives the compensated image signal C_D from the compensation unit 330 and the normal image signal N_D from the normal image signal processing unit 340. The mapping unit 350 may map the compensated image signal C_D and the normal image signal N_D in a way such that the compensated image signal C_D and the normal image signal N_D correspond to the pixels PX of the display panel DP (refer to FIG. 10) and outputs a mapping signal M D. In an embodiment, for example, the mapping unit 350 may map the normal image signal N_D onto a pixel unit in the first display region DA1 and may map the compensated image signal C_D onto a pixel unit in the second display region DA2. That is, the normal image signal N_D may be mapped onto the four emissive regions EA-B, EA-G, and EA-R illustrated in FIG. 6, and the compensated image signal C_D may be mapped onto the three emissive regions EA-B, EA-G, and EA-R illustrated in FIG. 8.

The four emissive regions EA-B, EA-G, and EA-R illustrated in FIG. 6 and the three emissive regions EA-B, EA-G, and EA-R illustrated in FIG. 8 may correspond to the pixels PX, respectively.

The inverse gamma conversion unit 360 may output the data signal DATA by non-linearizing the mapping signal M D based on an output gamma look-up table calculated by an inverse gamma function of the gamma look-up table in the gamma conversion unit 310. In an embodiment, for example, where the gamma look-up table of the gamma conversion unit 310 is formed by a gamma function having a gamma value of 2.2, the output gamma look-up table of the inverse gamma conversion unit 360 may be formed by an inverse gamma function having a gamma value of 2.2. The output gamma look-up table may store gray scale data calculated by the inverse gamma function of the gamma look-up table.

Figure 13:
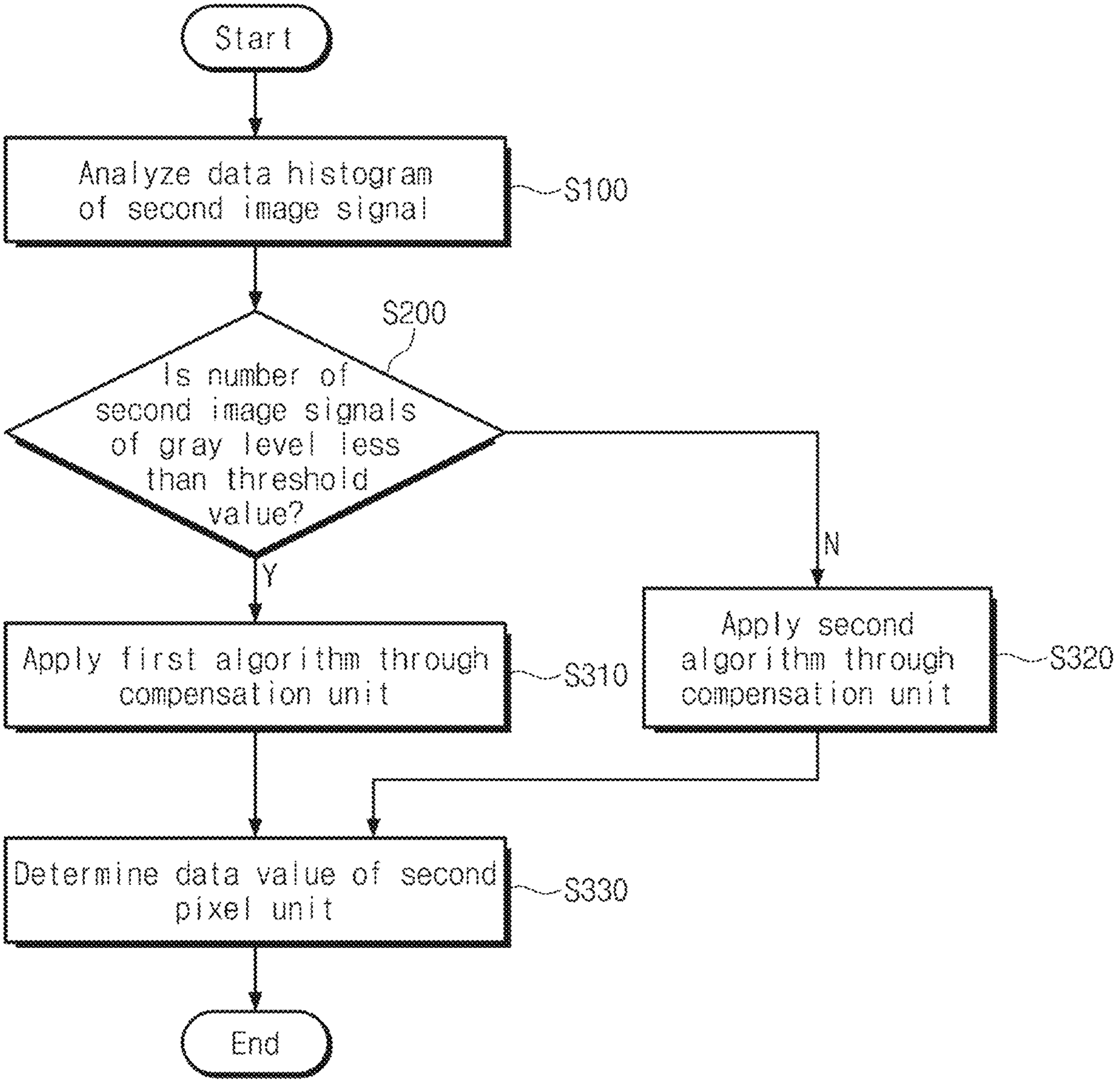
FIG. 13 is a flowchart illustrating operation of the drive controller according to an embodiment of the disclosure.

FIG. 13 is a flowchart illustrating operation of the drive controller according to an embodiment of the disclosure.

Referring to FIGS. 12 and 13, the compensation unit 330 may generate the data histogram BH (refer to FIG. 14) by classifying the second image signal RGB2 based on the plurality of gray levels. The second image signal RGB2 may be expressed in 0 to 255 gray scales. The compensation unit 330 may classify the second image signal RGB2 into the plurality of gray levels based on the 0 to 255 gray scales. The compensation unit 330 may analyze the data histogram BH (S100).

The compensation unit 330 may compare the number of the second image signals RGB2 included in a part of the plurality of gray levels with a threshold value (S200). In an embodiment, for example, the compensation unit 330 may set the threshold value based on the number of the second image signals RGB2 corresponding to a low gray scale among the plurality of gray levels.

In an embodiment, for example, the number of the second image signals RGB2 included in two lowest gray levels among the plurality of gray levels of the data histogram BH (refer to FIG. 14) may have a value in a range of 80% to 90% of the total number of the second image signals RGB2. However, this is illustrative, and the threshold value may be diversely set by the user according to an embodiment of the disclosure.

The compensation unit 330 may operate based on the first algorithm and the second algorithm different from the first algorithm.

The compensation unit 330 may select the first algorithm when the number of the second image signals RGB2 included in a part of the plurality of gray levels is less than the threshold value (S310).

The compensation unit 330 may select the second algorithm when the number of the second image signals RGB2 included in a part of the plurality of gray levels is greater than or equal to the threshold value (S320).

The compensation unit 330 may determine a data value of the second pixel unit AR1' (S330). The data value may be the compensated image signal C_D.

Figure 14:
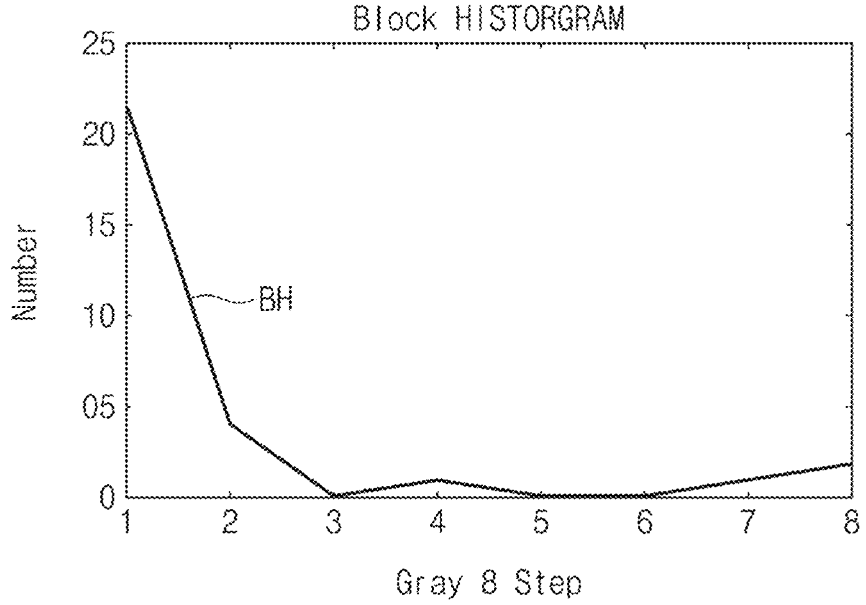
FIG. 14 illustrates a data histogram according to an embodiment of the disclosure.

FIG. 14 illustrates a data histogram according to an embodiment of the disclosure.

Referring to FIGS. 12 to 14, the data histogram BH is a graph depicting the number of the second image signals RGB2 included in each of eight gray levels into which the 0 to 255 gray scales are classified. However, this is illustrative, and the number of gray levels according to an embodiment of the disclosure is not limited thereto. In an alternative embodiment, for example, the 0 to 255 gray scales may be classified into 16 gray levels, each of which includes 16 gray scales.

In the data histogram BH (refer to FIG. 14), the horizontal axis represents the plurality of gray levels, and the vertical axis represents the number of the second image signals RGB2 included in each of the plurality of gray levels.

The drive controller 110 may select the first algorithm when the number of the second image signals RGB2 included in two lowest gray levels among the plurality of gray levels of the data histogram BH is greater than or equal to 0% and less than 80% of the total number of the second image signals RGB2.

The drive controller 110 may select the second algorithm when the number of the second image signals RGB2 included in the two lowest gray levels among the plurality of gray levels of the data histogram BH is greater than or equal to 80% and less than 100% of the total number of the second image signals RGB2.

Referring to the data histogram BH, 28 second image signals RGB2 may be provided in the second display region DA2 when the second pixel unit AR1' and the non-pixel units AR2 of FIG. 7 are referred to. The number of the second image signals RGB2 included in the two lowest gray levels may be 24. That is, the number of the second image signals RGB2 included in the two lowest gray levels among the plurality of gray levels may be 85% of the total number of the second image signals RGB2. That is, when the data histogram BH is generated as illustrated in FIG. 14, the compensation unit 330 may apply the second algorithm (S320).

Figure 15:
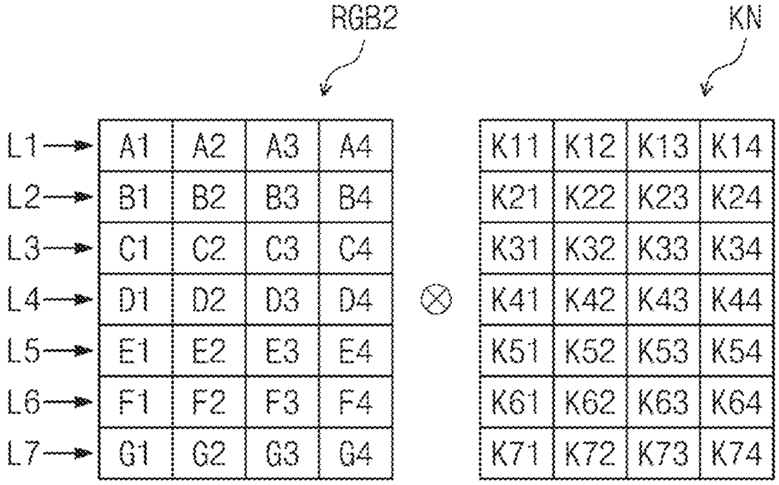
FIG. 15 illustrates a second image signal and a kernel matrix provided to a first algorithm and a second algorithm according to an embodiment of the disclosure.

FIG. 15 illustrates a second image signal and a kernel matrix provided to the first algorithm and the second algorithm according to an embodiment of the disclosure.

Referring to FIGS. 12 and 15, the second image signal RGB2 may include image signals A1 to A4, B1 to B4, C1 to C4, D1 to D4, E1 to E4, F1 to F4, and G1 to G4. The image signals A1 to A4 may be referred to as a first line L1 of the second image signal RGB2, the image signals B1 to B4 may be referred to as a second line L2 of the second image signal RGB2, the image signals C1 to C4 may be referred to as a third line L3 of the second image signal RGB2, the image signals D1 to D4 may be referred to as a fourth line L4 of the second image signal RGB2, the image signals E1 to E4 may be referred to as a fifth line L5 of the second image signal RGB2, the image signals F1 to F4 may be referred to as a sixth line L6 of the second image signal RGB2, and the image signals G1 to G4 may be referred to as a seventh line L7 of the second image signal RGB2.

The first to seventh lines L1 to L7 of the second image signal RGB2 may be provided from the memory 320. In an embodiment, the first to sixth lines L1 to L6 of the second image signal RGB2 may be provided from the memory 320, and the seventh line L7 may be the gamma image signal GI output from the gamma conversion unit 310. That is, the gamma image signal GI of the currently input line may be directly provided to the compensation unit 330 except through the memory 320.

In an embodiment, the image signals A1 to A4, B1 to B4, C1 to C4, D1 to D4, E1 to E4, F1 to F4, and G1 to G4 may correspond to the second pixel unit AR1' and the non-pixel units AR2 of region BB' illustrated in FIG. 7. In such an embodiment, the image signal D3 may correspond to the second pixel unit AR1', and the remaining image signals A1 to A4, B1 to B4, C1 to C4, D1, D2, D4, E1 to E4, F1 to F4, and G1 to G4 may correspond to the non-pixel units AR2.

The kernel matrix KN may include kernel data K11 to K14, K21 to K24, K31 to K34, K41 to K44, K51 to K54, K61 to K64, and K71 to K74. That is, the kernel matrix KN may include a×b kernel data (where a and b are natural numbers). Hereinafter, for convenience of description, an embodiment where the size of the kernel matrix KN is 7×4 as shown in FIG. 15 will be described. However, the size of the kernel matrix KN according to an embodiment of the disclosure is not limited thereto. In an embodiment, for example, the size of the kernel matrix KN may be diversely changed.

The compensation unit 330 may perform convolution operation on the image signals A1 to A4, B1 to B4, C1 to C4, D1 to D4, E1 to E4, F1 to F4, and G1 to G4 and the kernel data K11 to K14, K21 to K24, K31 to K34, K41 to K44, K51 to K54, K61 to K64, and K71 to K74 and may output the compensated image signal C_D.

In an embodiment, for example, the compensation unit 330 may output, as the first result value, a value obtained based on the image signals A1 to A4, B1 to B4, C1 to C4, D1 to D4, E1 to E4, F1 to F4, and G1 to G4 and the kernel data K11 to K14, K21 to K24, K31 to K34, K41 to K44, K51 to K54, K61 to K64, and K71 to K74, e.g., by computing the product of corresponding ones among the image signals A1 to A4, B1 to B4, C1 to C4, D1 to D4, E1 to E4, F1 to F4, and G1 to G4 in the second image signal RGB2 and the kernel data K11 to K14, K21 to K24, K31 to K34, K41 to K44, K51 to K54, K61 to K64, and K71 to K74 in the kernel matrix KN and dividing the product by the sum of the kernel data.

The compensation unit 330 may output the compensated image signal C_D corresponding to the second pixel unit AR1', based on the first result value. In this case, the method of outputting the compensated image signal C_D may be referred to as the first algorithm.

The compensation unit 330 may compare the number of the second image signals RGB2 included in a part of the plurality of gray levels with the threshold value. The compensation unit 330 may set the threshold value based on the number of the second image signals RGB2 corresponding to a low gray scale among the plurality of gray levels. The compensation unit 330 may select the first algorithm when the number of the second image signals RGB2 included in a part of the plurality of gray levels is less than the threshold value.

When the number of the second image signals RGB2 included in a part of the plurality of gray levels is less than the threshold value, it may mean that the number of the second image signals RGB2 corresponding to a low gray scale is small. In this case, the compensation unit 330 may determine that the second image signal RGB2 is not an image signal representing black. The compensation unit 330 may compute the second image signal RGB2 and the preset kernel matrix KN by applying the first algorithm.

According to an embodiment of the disclosure, since the image signal processing circuit 210 outputs the data signal DATA in consideration of not only the first signal corresponding to the second pixel unit AR1' but also the second signal corresponding to the non-pixel unit AR2, the image signal processing circuit 210 may effectively prevent deterioration in the display quality of the second display region DA2 (refer to FIG. 4). Accordingly, the display device DD (refer to FIG. 1) having improved display quality may be provided.

The second algorithm may calculate the second result value less than the first result value, based on the first result value. The compensation unit 330 may output the compensated image signal C_D corresponding to the second pixel unit AR1', based on the second result value. In this case, the method of outputting the compensated image signal C_D may be referred to as the second algorithm.

The second algorithm may include a first method, a second method, and a third method.

The first method may calculate the second result value by multiplying the first result value by 0. The compensated image signal C_D output from the compensation unit 330 may have a value of 0. That is, the second pixel unit AR1' and the non-pixel unit AR2 may not emit light, and black may be represented in the second display region DA2 (refer to FIG. 4).

The second method may calculate the second result value by multiplying the first result value by a weighting value greater than 0 and less than 1. In an embodiment, for example, the weighting value may be 0.8 or 0.9. However, this is illustrative, and the weighting value according to an embodiment of the disclosure is not limited thereto. The compensated image signal C_D output from the compensation unit 330 may be output to have low gray scale data, and the ability of the second display region DA2 (refer to FIG. 4) to represent black may be improved.

The third method may calculate the second result value by substituting a function into the first result value, which will be described later in greater detail.

The compensation unit 330 may select the second algorithm when the number of the second image signals RGB2 included in a part of the plurality of gray levels is greater than or equal to the threshold value.

When the number of the second image signals RGB2 included in a part of the plurality of gray levels is greater than or equal to the threshold value, it may mean that the number of the second image signals RGB2 corresponding to a low gray scale is large. In this case, the compensation unit 330 may determine that the second image signal RGB2 is an image signal representing black. The compensation unit 330 may calculate the second result value that is less than the first result value obtained based on (or by computing) the second image signal RGB2 and the preset kernel matrix KN by applying the second algorithm and is appropriate for representing black.

According to an embodiment of the disclosure, when it is determined that the second image signal RGB2 is an image signal representing black, the image signal processing circuit 210 may apply the second algorithm to allow the second pixel unit AR1' to effectively represent black such that deterioration in the display quality for the representation of black by the second display region DA2 (refer to FIG. 4) may be effectively prevented. Accordingly, the display device DD (refer to FIG. 1) having improved display quality may be provided.

Figure 16:
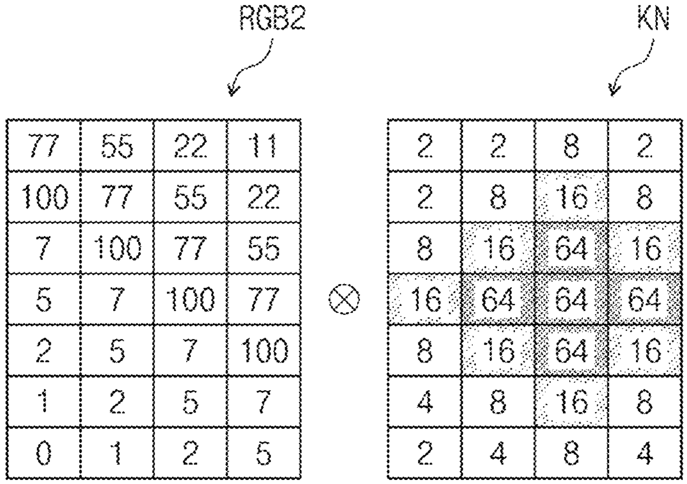
FIG. 16 illustrates exemplary values of the second image signal and the kernel matrix provided to the first algorithm and the second algorithm according to an embodiment of the disclosure.

FIG. 16 illustrates exemplary values of the second image signal and the kernel matrix provided to the first algorithm and the second algorithm according to an embodiment of the disclosure.

Referring to FIGS. 12, 15, and 16, the gray scale of the image signals B1, C2, D3, and E4 of the second image signal RGB2 may be 100, the gray scale of the image signals A1, B2, C3, and D4 may be 77, the gray scale of the image signals A2, B3, and C4 may be the gray scale of the image signal A4 may be 11, the gray scale of the image signals C1, D2, E3, and F4 may be 7, the gray scale of the image signals D1, E2, F3, and G4 may be 5, the gray scale of the image signals E1, F2, and G3 may be 2, the gray scale of the image signals F1 and G2 may be 1, and the gray scale of the image signal G1 may be 0.

Since the second display region DA2 (refer to FIG. 4) includes the non-pixel unit AR2 (refer to FIG. 7) that does not provide an image, the second display region DA2 may have a lower resolution than the first display region DA1 (refer to FIG. 4).

If the image signal D3 is provided to the mapping unit 350 as it is without a compensation operation of the compensation unit 330, the image signals A1 to A4, B1 to B4, C1 to C4, D1, D2, D4, E1 to E4, F1 to F4, and G1 to G4 corresponding to the non-pixel unit AR2 (refer to FIG. 7) may not be used, and therefore the display quality of the second display region DA2 (refer to FIG. 4) may be deteriorated. However, according to an embodiment of the disclosure, when the first algorithm is applied, the compensation unit 330 may output the compensated image signal C_D corresponding to the second pixel unit AR1' (refer to FIG. 7), based on not only the image signal D3 corresponding to the second pixel unit AR1' (refer to FIG. 7) but also the image signals A1 to A4, B1 to B4, C1 to C4, D1, D2, D4, E1 to E4, F1 to F4, and G1 to G4 corresponding to the non-pixel unit AR2 (refer to FIG. 7), and thus deterioration in the display quality of the second display region DA2 (refer to FIG. 4) may be effectively prevented. Accordingly, the display device DD (refer to FIG. 1) having improved display quality may be provided.

Furthermore, if the compensation unit 330 does not operate with the second algorithm, black may not be effectively represented in the second pixel unit AR1' (refer to FIG. 7) due to the values of the image signals A1 to A4, B1 to B4, C1 to C4, D1, D2, D4, E1 to E4, F1 to F4, and G1 to G4 corresponding to the non-pixel unit AR2 (refer to FIG. 7) even though the image signal D3 represents black having a value of 0. However, according to an embodiment of the disclosure, when it is determined that the second image signal RGB2 is an image signal representing black, the compensation unit 330 may output the second result value less than the first result value by applying the second algorithm to the first result value output based on not only the image signal D3 corresponding to the second pixel unit AR1' (refer to FIG. 7) but also the image signals A1 to A4, B1 to B4, C1 to C4, D1, D2, D4, E1 to E4, F1 to F4, and G1 to G4 corresponding to the non-pixel unit AR2 (refer to FIG. 7) such that deterioration in the display quality for the representation of black by the second display region DA2 (refer to FIG. 4) may be effectively prevented. Accordingly, the display device DD (refer to FIG. 1) having improved display quality may be provided.

The kernel data K11 to K14, K21 to K24, K31 to K34, K41 to K44, K51 to K54, K61 to K64, and K71 to K74 in the kernel matrix KN may be determined based on the image signals A1 to A4, B1 to B4, C1 to C4, D1 to D4, E1 to E4, F1 to F4, and G1 to G4 in the second image signal RGB2.

The values of the kernel data K11 to K14, K21 to K24, K31 to K34, K41 to K44, K51 to K54, K61 to K64, and K71 to K74 illustrated in FIG. 16 are illustrative, and the disclosure is not limited thereto.

Figure 17:
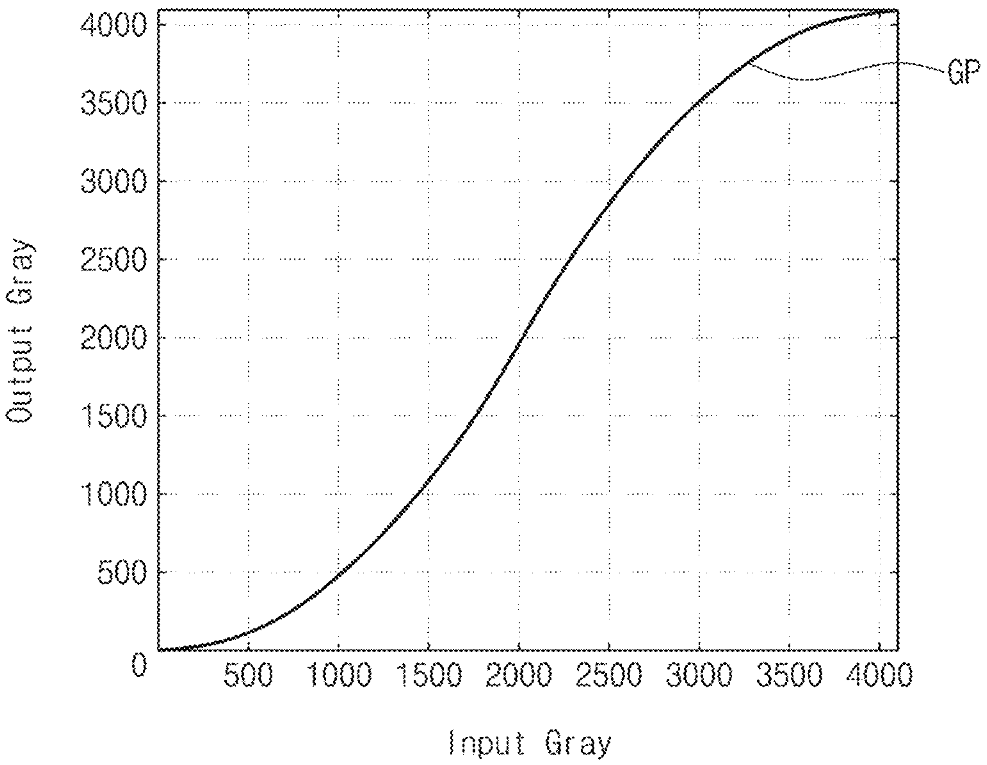
FIG. 17 illustrates a function used in a third method of the second algorithm according to an embodiment of the disclosure.

FIG. 17 illustrates a function used in the third method of the second algorithm according to an embodiment of the disclosure.

Referring to FIGS. 13 to 17, the third method of the second algorithm may calculate the second result value based on the first result value using an n-th order function (n>1), e.g., by substituting the first result value into the n-th order function (n>1). Although FIG. 17 illustrates a graph GP in which n is 3, that is, the n-th order function is a cubic function, the n-th order function according to an embodiment of the disclosure is not limited thereto. The graph GP according to an embodiment of the disclosure may be applied without limitation when it is a graph having a value less than that of the graph y=x in a low gray scale region.

In the graph GP of FIG. 17, the x axis may refer to a first output value. The first output value may be referred to as input gray. The y axis may refer to a second output value. The second output value may be referred to as output gray.

In the third method, when the first output value is substituted into the function in the low gray scale region, the second output value less than the first output value may be calculated. The compensated image signal C_D output from the compensation unit 330 may be output to have low gray scale data, and the ability of the second display region DA2 (refer to FIG. 4) to represent black may be improved.

According to an embodiment of the disclosure, when it is determined that the second image signal RGB2 is an image signal representing black, the image signal processing circuit 210 may apply the second algorithm to allow the second pixel unit AR1' to effectively represent black such that deterioration in the display quality for the representation of black by the second display region DA2 (refer to FIG. 4)

may be effectively prevented. Accordingly, the display device DD (refer to FIG. 1) having improved display quality may be provided.

The compensation unit 330 according to an embodiment of the disclosure may select the first method of the second algorithm when the number of the second image signals RGB2 included in two lowest gray levels among the plurality of gray levels of the data histogram BH is greater than or equal to 90% of the total number of the second image signals RGB2.

The compensation unit 330 may select the second method or the third method of the second algorithm when the number of the second image signals RGB2 included in the two lowest gray levels among the plurality of gray levels of the data histogram BH is greater than or equal to 80% and less than 90% of the total number of the second image signals RGB2.

The compensation unit 330 may select the first algorithm when the number of the second image signals RGB2 included in the two lowest gray levels among the plurality of gray levels of the data histogram BH is greater than or equal to 0% and less than 80% of the total number of the second image signals RGB2.

According to an embodiment of the disclosure, the drive controller 110 may output the compensated image signal C_D for the representation of black by using an appropriate one of the first to third methods of the second algorithm for the representation of black depending on a situation such that display quality for the representation of black by the second display region DA2 (refer to FIG. 4) may be improved. Accordingly, the display device DD (refer to FIG. 1) having improved display quality may be provided.

Figure 18:
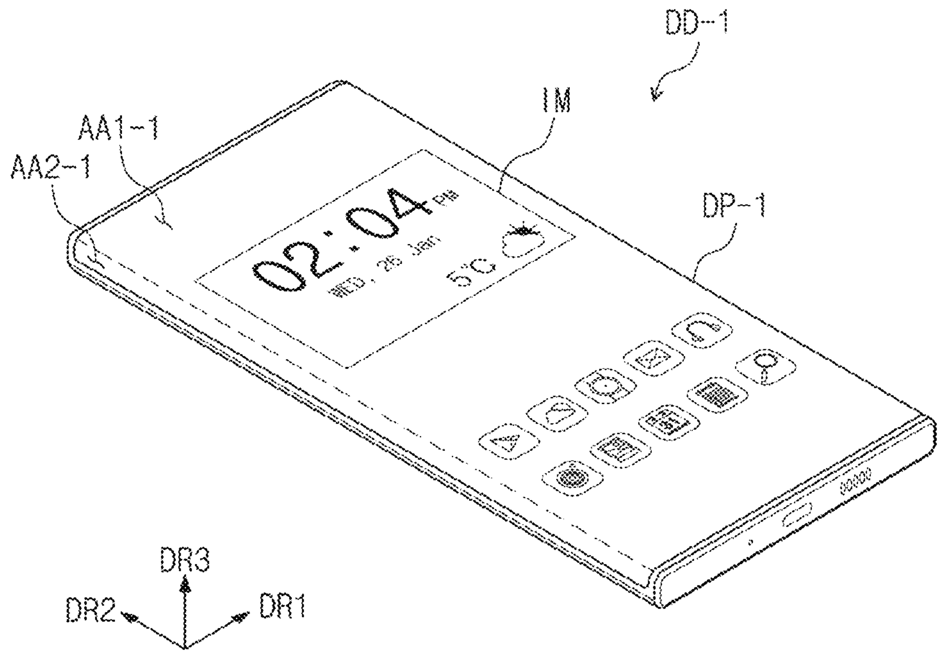
FIG. 18 is a perspective view illustrating a display device according to an embodiment of the disclosure.

FIG. 18 is a perspective view of a display device according to an embodiment of the disclosure.

Referring to FIGS. 4 and 18, an embodiment of the display device DD-1 may include a display panel DP-1. The display panel DP-1 may include a first portion AA1-1, a second portion AA2-1, and a third portion. The first portion AA1-1, the second portion AA2-1, and the third portion may display an image IM.

The first portion AA1-1 may be parallel to a plane defined by a first direction DR1 and a second direction DR2. The normal direction of the first portion AA1-1 may correspond to the thickness direction of the display device DD-1. A first display region DA1 may be defined in the first portion AA1-1.

The second portion AA2-1 may extend from the first portion AA1-1 in a direction opposite to the first direction DR1. The second portion AA2-1 may be bent from one side of the first portion AA1-1. A second display region DA2 may be defined in the second portion AA2-1. The resolution of the first display region DA1 may differ from the resolution of the second display region DA2. In an embodiment, for example, the resolution of the second display region DA2 may be lower than the resolution of the first display region DA1.

The third portion may extend from the first portion AA1-1 in the first direction DR1. The third portion may be bent from an opposite side of the first portion AA1-1, which is opposite to the one side of the first portion AA1-1 from which the second portion AA2-1 is bent. In an embodiment, the second display region DA2 may be defined in the third portion.

Figure 19:
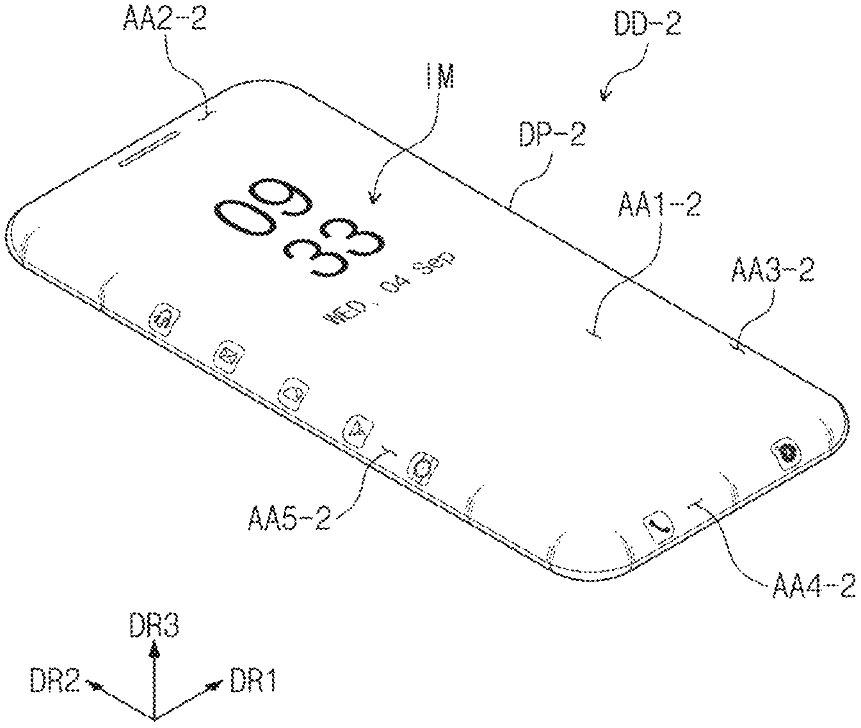
FIG. 19 is a perspective view illustrating a display device according to an alternative embodiment of the disclosure.

FIG. 19 is a perspective view illustrating a display device according to an alternative embodiment of the disclosure.

Referring to FIGS. 4 and 19, an embodiment of the display device DD-2 may include a display panel DP-2. The display panel DP-2 may include a first portion AA1-2, a second portion AA2-2, a third portion AA3-2, a fourth portion AA4-2, and a fifth portion AA5-2.

The first portion AA1-2 may be parallel to a plane defined by a first direction DR1 and a second direction DR2. The normal direction of the first portion AA1-2 may correspond to the thickness direction of the display device DD-2.

The second portion AA2-2 may extend from a first side of the first portion AA1-2. The third portion AA3-2 may extend from a second side of the first portion AA1-2 that crosses the first side. The fourth portion AA4-2 may extend from a third side of the first portion AA1-2 that crosses the first side. The fifth portion AA5-2 may extend from a fourth side of the first portion AA1-2 that crosses the first side.

At least a portion of each of the second portion AA2-2, the third portion AA3-2, the fourth portion AA4-2, and the fifth portion AA5-2 may be bent to have a predetermined curvature.

The area of a display region recognized by a user in the display device DD-2 may be increased by the second portion AA2-2, the third portion AA3-2, the fourth portion AA4-2, and the fifth portion AA5-2 that have the predetermined curvature. An image IM may be displayed on the display region.

A first display region DA1 may be defined in the first portion AA1-2. A second display region DA2 may be defined in each of the second portion AA2-2, the third portion AA3-2, the fourth portion AA4-2, and the fifth portion AA5-2. The resolution of the first display region DA1 may differ from the resolution of the second display region DA2. In an embodiment, for example, the resolution of the second display region DA2 may be lower than the resolution of the first display region DA1.

Figure 20A:
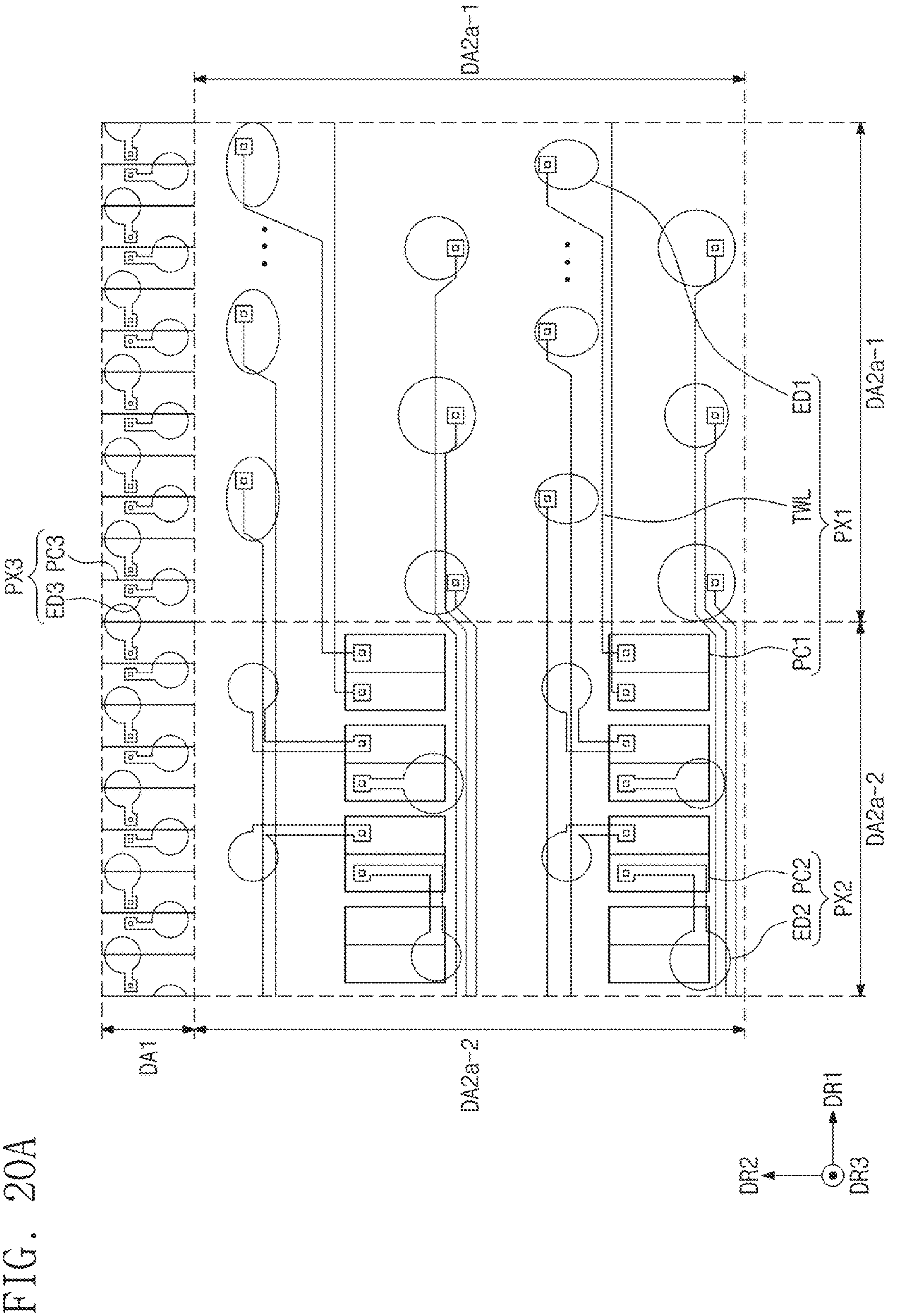
FIG. 20A is a plan view of a display panel according to an embodiment of the disclosure.
Figure 20B:
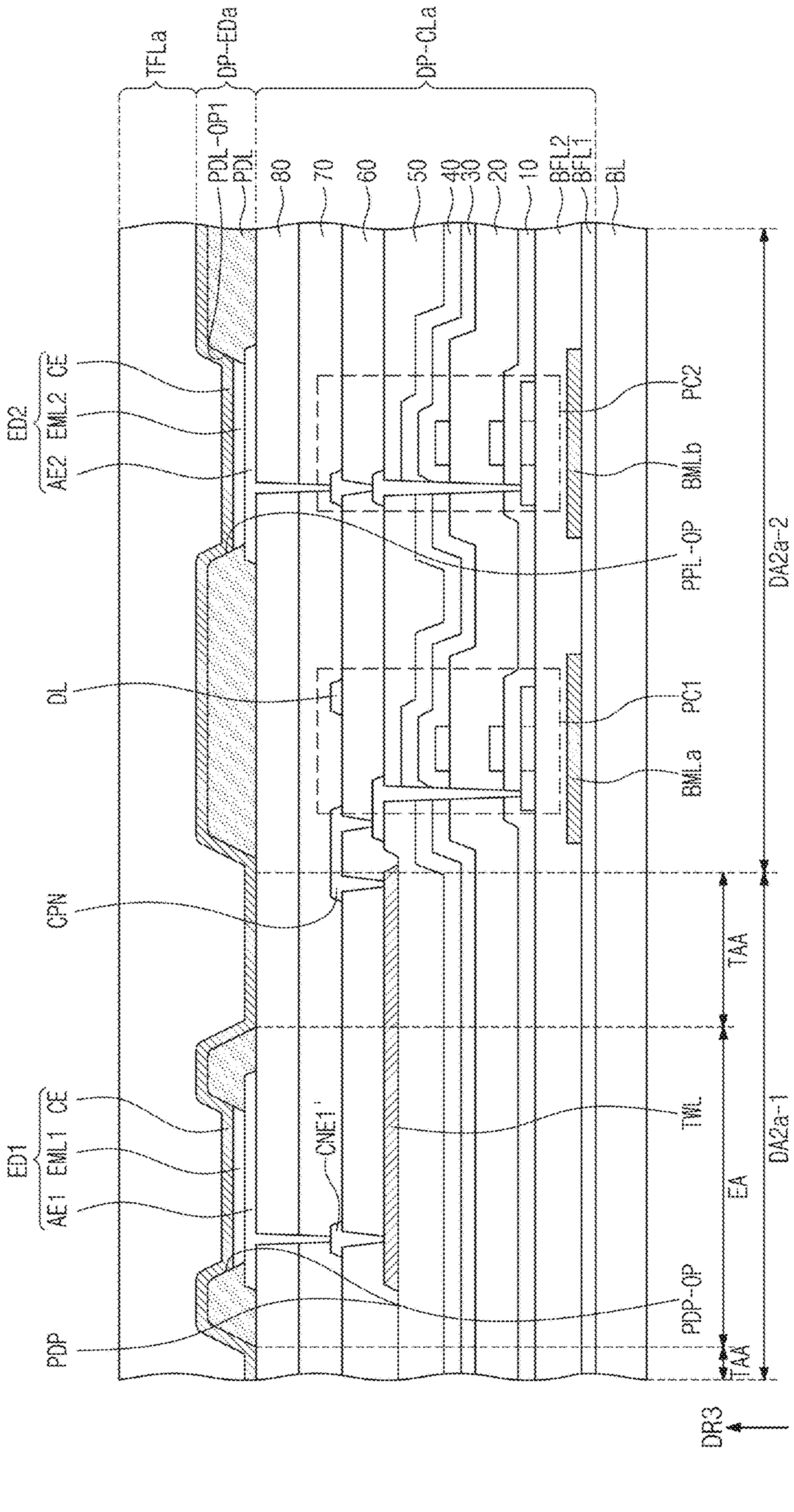
FIG. 20B is a cross-sectional view of the display panel according to an embodiment of the disclosure.

FIG. 20A is a plan view of a display panel according to an embodiment of the disclosure, and FIG. 20B is a cross-sectional view of the display panel according to an embodiment of the disclosure. In FIG. 20B, components identical or similar to the components described with reference to FIG. 9 will be assigned with identical or similar reference numerals, and any repetitive detailed descriptions thereof will be omitted or simplified.

Referring to FIGS. 4, 20A, and 20B, in an embodiment, a first region DA2*a*-1 and a second region DA2*a*-2 adjacent to the first region DA2*a*-1 may be defined in a second display region DA2. The first region DA2*a*-1 may be referred to as a component region, and the second region DA2*a*-2 may be referred to as an intermediate region or a transition region. A first display region DA1 may be referred to as a main display region or a general display region. The first region DA2*a*-1 and the second region DA2*a*-2 may be referred to as an auxiliary display region.

The display panel DP may include a plurality of pixels PX. The plurality of pixels PX may include a first pixel PX1 that emits light in the first region DA2*a*-1, a second pixel PX2 that emits light in the second region DA2*a*-2, and a third pixel PX3 that emits light in the first display region DA1.

In an embodiment, each of the first pixel PX1, the second pixel PX2, and the third pixel PX3 may be provided in plural, that is, a plurality of first pixels PX1, a plurality of second pixels PX2, and a plurality of third pixels PX3 may be provided. In such an embodiment, each of the first to third pixels PX1, PX2, and PX3 may include a red pixel, a green pixel, and a blue pixel and may further include a white pixel according to an embodiment.

The first pixel PX1 may include a first light emitting element ED1 and a first pixel circuit PC1 that drives the first light emitting element ED1. The second pixel PX2 may include a second light emitting element ED2 and a second pixel circuit PC2 that drives the second light emitting element ED2. The third pixel PX3 may include a third light emitting element ED3 and a third pixel circuit PC3 that drives the third light emitting element ED3.

When viewed on a plane, the first region DA2*a*-1 may overlap the electronic module EM (refer to FIG. 2). In an embodiment, for example, an external input (e.g., light) may be provided to the electronic module EM (refer to FIG. 2) through the first region DA2*a*-1, and an output from the electronic module EM may be emitted to the outside through the first region DA2*a*-1.

To secure the area of a transmissive region, a number of pixels provided in the first region DA2*a*-1 may be smaller than that of pixels provided in the first display region DA1. The region where the first light emitting element ED1 is not disposed in the first region DA2*a*-1 may be defined as the transmissive region.

The number of the first pixels PX1 per unit area or the same area (or pixel density) in the first region DA2*a*-1 may be smaller than the number of third pixels PX3 per unit area or the same area (or pixel density) in the first display region DAL The first pixel circuit PC1 of the first pixel PX1 may not be disposed in the first region DA2*a*-1. In an embodiment, for example, the first pixel circuit PC1 may be disposed in the second region DA2*a*-2 or a peripheral region NAA. In such an embodiment, the light transmittance of the first region DA2*a*-1 may be higher than that in the case in which the first pixel circuit PC1 is disposed in the first region DA2*a*-1.

The first light emitting element ED1 and the first pixel circuit PC1 may be electrically connected with each other through a connecting line TWL. The connecting line TWL may overlap the transmissive region of the first region DA2*a*-1. The connecting line TWL may include a transparent conductive line. The transparent conductive line may include a transparent conductive material or a light transmissive material. In an embodiment, for example, the connecting line TWL may include or be formed of a transparent conductive oxide (TCO) film, such as indium tin oxide (ITO), indium zinc oxide (IZO), indium gallium zinc oxide (IGZO), zinc oxide (ZnO), or indium oxide ($In_2O_3$).

The second region DA2*a*-2 may be adjacent to the first region DA2*a*-1. The second region DA2*a*-2 may surround at least a portion of the first region DA2*a*-1. The second region DA2*a*-2 may be a region having a lower light transmittance than the first region DA2*a*-1.

In an embodiment, the first pixel circuit PC1 of the first pixel PX1, the second light emitting element ED2, and the second pixel circuit PC2 may be disposed in the second region DA2*a*-2. Accordingly, the light transmittance of the second region DA2-2 may be lower than the light transmittance of the first region DA2*a*-1. In such an embodiment, as the first pixel circuit PC1 of the first pixel PX1 is disposed in the second region DA2*a*-2, the number of the second pixels PX2 per unit area or the same area in the second region DA2*a*-2 may be smaller than the number of third pixels PX3 per unit area or the same area in the first display region DA1. The resolution of an image displayed on the second region DA2*a*-2 may be lower than the resolution of an image displayed on the first display region DA1.

A circuit element layer DP-CLa may be disposed on a base layer BL. The circuit element layer DP-CLa may be defined as a layer from (or by a structure including) a first buffer layer BFL1 to an eighth insulating layer 80.

A first shielding pattern BMLa and a second shielding pattern BMLb may be disposed on the first buffer layer BFL1. The first shielding pattern BMLa and the second shielding pattern BMLb may prevent electric potential due to polarization of the base layer BL from affecting the first to third pixel circuits PC1, PC2, and PC3.

A first connecting electrode may be disposed on a sixth insulating layer 60. A seventh insulating layer 70 may be disposed on the sixth insulating layer 60. A second connecting electrode electrically connected with the first connecting electrode may be disposed on the seventh insulating layer 70. A data line DL may be disposed on the sixth insulating layer 60. The eighth insulating layer 80 may be disposed on the seventh insulating layer 70.

A light emitting element layer DP-EDa may be disposed on the circuit element layer DP-CLa. The light emitting element layer DP-EDa may be defined as a layer in which the first to third light emitting elements ED1, ED2, and ED3 are disposed.

The first light emitting element ED1 may include a first pixel electrode AE1, a first emissive layer EML1, and a common electrode CE. The second light emitting element ED2 may include a second pixel electrode AE2, a second emissive layer EML2, and the common electrode CE. The common electrode CE may be connected to the pixels PX and may be commonly provided. The first pixel electrode AE1 and the second pixel electrode AE2 may be disposed on the eighth insulating layer 80.

A pixel defining film PDL and a pixel defining pattern PDP may be disposed on the eighth insulating layer 80. The pixel defining film PDL and the pixel defining pattern PDP may include a same material as each other and may be formed through a same process as each other. The pixel defining film PDL may be disposed in the second region DA2*a*-2 and the first display region DA1. In an embodiment, for example, a first opening PDL-OP1 for exposing a portion of the second pixel electrode AE2 may be defined in the pixel defining film PDL.

The pixel defining pattern PDP may be disposed in the first region DA2*a*-1. The pixel defining pattern PDP may cover a portion of the first pixel electrode AE1. In an embodiment, for example, the pixel defining pattern PDP may cover the periphery of the first pixel electrode AE1. An opening PDP-OP may be defined in the pixel defining pattern PDP. The opening PDP-OP may be defined in a region overlapping the first pixel electrode AE1. The pixel defining pattern PDP may have a ring shape when viewed on a plane.

In the first region DA2*a*-1, a region overlapping the portion in which the first pixel electrode AE1 and the pixel defining pattern PDP are disposed may be defined as an element region EA, and the remaining region may be defined as a transmissive region TAA.

The first pixel electrode AE1 may be electrically connected with the first pixel circuit PC1 disposed in the second region DA2*a*-2. In an embodiment, for example, the first pixel electrode AE1 may be electrically connected with the first pixel circuit PC1 through the connecting line TWL and a connecting bridge CPN. In such an embodiment, the connecting line TWL may overlap the transmissive region TAA. In such an embodiment, the connecting line TWL may include a light transmissive material. In an embodiment, the first pixel electrode AE1 may be electrically connected with the connecting line TWL through a connecting electrode CNE1'.

The connecting line TWL may be disposed between the fifth insulating layer 50 and the sixth insulating layer 60, but is not particularly limited thereto. Alternatively, the connecting bridge CPN may be disposed between the sixth insulating layer 60 and the seventh insulating layer 70. The connecting bridge CPN may be connected to the connecting line TWL and the first pixel circuit PC1. An upper insulating layer TFLa may be disposed on the light emitting element layer DP-EDa.

In embodiments of the invention, as described above, when the first algorithm is applied, the drive controller may output the compensated image signal corresponding to the second pixel unit, based on not only the image signal corresponding to the second pixel unit but also the image signals corresponding to the non-pixel unit, thereby preventing deterioration in the display quality of the second display region. Accordingly, the display device may have improved display quality.

In embodiments of the invention, as described above, the drive controller may apply the second algorithm when it is determined that the second image signal is an image signal representing black. The drive controller may output the second result value less than the first result value by applying at least one selected from the first to third methods to the first result value output based on not only the image signal corresponding to the second pixel unit but also the image signals corresponding to the non-pixel unit. The data signal output from the drive controller may be output to have low gray scale data, and the ability of the second display region to represent black may be improved. Accordingly, the display device may have improved display quality.

The invention should not be construed as being limited to the embodiments set forth herein. Rather, these embodiments are provided so that this disclosure will be thorough and complete and will fully convey the concept of the invention to those skilled in the art.

While the invention has been described with reference to embodiments thereof, it will be understood by those of ordinary skill in the art that various changes and modifications may be made thereto without departing from the spirit and scope of the invention as defined by the following claims.

What is claimed is:

1. A display device comprising:

a display panel in which a first display region having a first light transmittance and a second display region having a second light transmittance higher than the first light transmittance are defined; and a drive controller which receives an input image signal and outputs a data signal to be provided to the display panel, wherein the drive controller classifies the input image signal into a first image signal corresponding to a first pixel unit in the first display region of the display panel and a second image signal corresponding to a second pixel unit and a non-pixel unit adjacent to the second pixel unit in the second display region of the display panel, wherein the drive controller generates a data histogram by classifying the second image signal based on a plurality of gray levels and selects a first algorithm or a second algorithm different from the first algorithm based on a number of second image signals included in a part of the plurality of gray levels of the data histogram, wherein the second algorithm calculates a second result value less than a first result value, based on the first result value obtained based on the second image signal and a preset kernel matrix, and wherein the drive controller outputs a first data signal corresponding to the second pixel unit in the second display region based on the second result value when the second algorithm is selected.

2. The display device of claim 1, wherein the first algorithm computes an operation on the second image signal and the preset kernel matrix, and wherein the drive controller outputs a second data signal corresponding to the second pixel unit in the second display region when the first algorithm is selected.

3. The display device of claim 1, wherein the second algorithm calculates the second result value by multiplying the first result value by 0.

4. The display device of claim 1, wherein the second algorithm calculates the second result value by multiplying the first result value by a weighting value greater than 0 and less than 1.

5. The display device of claim 1, wherein the second algorithm calculates the second result value by substituting the first result value into a function.

6. The display device of claim 5, wherein the function includes a cubic function.

7. The display device of claim 1, further comprising:

an electronic module disposed to overlap the second display region.

8. The display device of claim 1, wherein the number of second pixel units per unit area in the second display region is smaller than the number of first pixel units per unit area in the first display region.

9. The display device of claim 1, wherein the drive controller selects the second algorithm when the number of second image signals included in two lowest gray levels among the plurality of gray levels of the data histogram is in a range of 80% to 90% of the total number of second image signals.

10. The display device of claim 1, wherein the display panel includes:

a first portion including a first side, a second side parallel to the first side, a third side extending in a direction crossing the first side, and a fourth side parallel to the second side;

a second portion extending from the first side and at least partially bent; and a third portion extending from the second side and at least partially bent.

11. The display device of claim 10, wherein the first display region is defined in the first portion, and wherein the second display region is defined in the second portion and the third portion.

12. The display device of claim 10, wherein the display panel further includes a fourth portion extending from the third side and at least partially bent and a fifth portion extending from the fourth side and at least partially bent, and wherein the second display region is defined in the fourth portion and the fifth portion.

13. The display device of claim 1, wherein the drive controller includes:

a gamma conversion unit which converts the input image signal into a gamma image signal;

a memory which stores the gamma image signal and outputs the first image signal corresponding to the first pixel unit in the first display region and the second image signal corresponding to the second pixel unit and the non-pixel unit in the second display region;

a compensation unit which compute the second image signal and the kernel matrix and outputs a compensated signal;

a mapping unit which maps the compensated signal onto the second pixel unit in the second display region; and an inverse gamma conversion unit which converts a signal output from the mapping unit into the data signal.

14. A display device comprising:

a display panel in which a first display region having a first light transmittance and a second display region having a second light transmittance higher than the first light transmittance are defined; and a drive controller which receives an input image signal and outputs a data signal to be provided to the display panel, wherein the drive controller classifies the input image signal into a first image signal corresponding to a first pixel unit in the first display region of the display panel and a second image signal corresponding to a second pixel unit and a non-pixel unit adjacent to the second pixel unit in the second display region of the display panel, wherein the drive controller generates a data histogram by classifying the second image signal based on a plurality of gray levels and selects a first algorithm or a second algorithm different from the first algorithm based on the number of second image signals included in a part of the plurality of gray levels of the data histogram, wherein the first algorithm calculates a first result value by computing the second image signal and a preset kernel matrix, and the second algorithm calculates a second result value less than the first result value, based on the first result value, and wherein the drive controller outputs a first data signal corresponding to the second pixel unit in the second display region when the first algorithm is selected, and the drive controller outputs a second data signal corresponding to the second pixel unit in the second display region based on the second result value when the second algorithm is selected.

15. The display device of claim 14, wherein the second algorithm includes a first method, a second method, and a third method, wherein the first method calculates the second result value by multiplying the first result value by 0, wherein the second method calculates the second result value by multiplying the first result value by a weighting value greater than 0 and less than 1, and wherein the third method calculates the second result value by substituting the first result value into an n-th order function, wherein n is an integer greater than 1.

16. The display device of claim 15, wherein the drive controller selects the first method when the number of second image signals included in two lowest gray levels among the plurality of gray levels of the data histogram is 90% or more of the total number of second image signals, wherein the drive controller selects the second method or the third method when the number of the second image signals included in the two lowest gray levels among the plurality of gray levels of the data histogram is greater than or equal to 80% and less than 90% of the total number of the second image signals, and wherein the drive controller selects the first algorithm when the number of the second image signals included in the two lowest gray levels among the plurality of gray levels of the data histogram is greater than or equal to 0% and less than 80% of the total number of the second image signals.

17. The display device of claim 14, wherein the number of second pixel units per unit area in the second display region is smaller than the number of first pixel units per unit area in the first display region.

18. The display device of claim 14, further comprising:

an electronic module disposed to overlap the second display region, wherein the electronic module includes a camera.

19. The display device of claim 14, wherein the display panel includes:

a first portion including a first side, a second side parallel to the first side, a third side extending in a direction crossing the first side, and a fourth side parallel to the second side, wherein the first display region is defined in the first portion;

a second portion extending from the first side and at least partially bent, wherein the second display region is defined in the second portion; and a third portion extending from the second side and at least partially bent, wherein the second display region is defined in the third portion.

20. The display device of claim 19, wherein the display panel further includes a fourth portion extending from the third side and at least partially bent and a fifth portion extending from the fourth side and at least partially bent, and wherein the second display region is defined in the fourth portion and the fifth portion.

* * * * *